(12) United States Patent
Cohen

(10) Patent No.: US 10,125,959 B2
(45) Date of Patent: Nov. 13, 2018

(54) CEILING TRIGGERED SPRING CLIP FOR LIGHTING MODULE INSTALL

(71) Applicant: Brandon Cohen, Vernon, CA (US)

(72) Inventor: Brandon Cohen, Vernon, CA (US)

(*) Notice: Subject to any disclaimer, the term of this patent is extended or adjusted under 35 U.S.C. 154(b) by 0 days.

(21) Appl. No.: 15/417,229

(22) Filed: Jan. 27, 2017

(65) Prior Publication Data
US 2018/0216809 A1     Aug. 2, 2018

(51) Int. Cl.
| F21V 21/26 | (2006.01) |
| F21S 8/02 | (2006.01) |
| F21V 17/16 | (2006.01) |
| F16B 2/20 | (2006.01) |

(52) U.S. Cl.
CPC ............. *F21V 21/26* (2013.01); *F16B 2/205* (2013.01); *F21S 8/026* (2013.01); *F21V 17/166* (2013.01)

(58) Field of Classification Search
CPC .......... F21V 21/26; F16B 2/205; F21S 17/166
USPC ........................................................ 362/418
See application file for complete search history.

(56) References Cited

U.S. PATENT DOCUMENTS

| 3,815,857 | A | * | 6/1974 | McFarlin | F21S 8/02 174/503 |
| 5,122,944 | A | * | 6/1992 | Webb | F21V 21/04 362/147 |
| 5,377,088 | A | * | 12/1994 | Lecluze | F21V 21/04 248/343 |
| 5,964,523 | A | * | 10/1999 | Eversberg | F21V 21/04 362/148 |
| 9,052,101 | B1 | * | 6/2015 | Kathawate | F21V 21/046 |
| 2005/0207146 | A1 | * | 9/2005 | Reggiani | F21V 21/04 362/150 |
| 2010/0039829 | A1 | * | 2/2010 | Tsai | F21S 8/026 362/373 |
| 2011/0235342 | A1 | * | 9/2011 | Liang | F21V 21/04 362/364 |
| 2015/0330611 | A1 | * | 11/2015 | Abai | F21V 21/03 362/418 |
| 2017/0045214 | A1 | * | 2/2017 | Johnson | F21V 3/061 |

OTHER PUBLICATIONS

A LED lighting module, with "spring buckles" made available by TorchStar Lighting, model No. TS061. http://www.torchstar.us/12watt-4-inch-dimmable-retrofit-led-recessed-light.html.
A LED lighting module, with "spring clips" made available by OMAI Lighting, Product Code OMSZCD08W01WW. http://www.omailighting.com/product/8w-3-5-Inch-led-recessed-lighting-75w-halogen-bulbs-equivalent-led-driver-Included-400lm-warm-white-3000K-90-beam-angle-recessed-ceiling-downlight.html?search=recessed&page=2.

* cited by examiner

*Primary Examiner* — Bryon T Gyllstrom
(74) *Attorney, Agent, or Firm* — Eric Kelly

(57) ABSTRACT

A preloadable trigger-release-clip that may be ceiling triggered for lighting module installation is described, including systems and methods of use. The trigger-release-clip may include a base-plate, a trigger, a clip, and a stop. The base-plate may be a structural member that attaches to a lighting module. The trigger may be in communication with the base-plate. The clip, with a torsion-spring, may be in communication with the base-plate. The stop may be in communication with the trigger. In a pre-loaded configuration, the stop may be in an up position that prevents the clip from actuating. In a final configuration, the stop has been retracted into a down position by the trigger being depressed by a bottom of a ceiling that may allow the clip to actuate, such that a terminal end of the clip pivots to grab a top of the ceiling securing the lighting module to the ceiling.

20 Claims, 22 Drawing Sheets

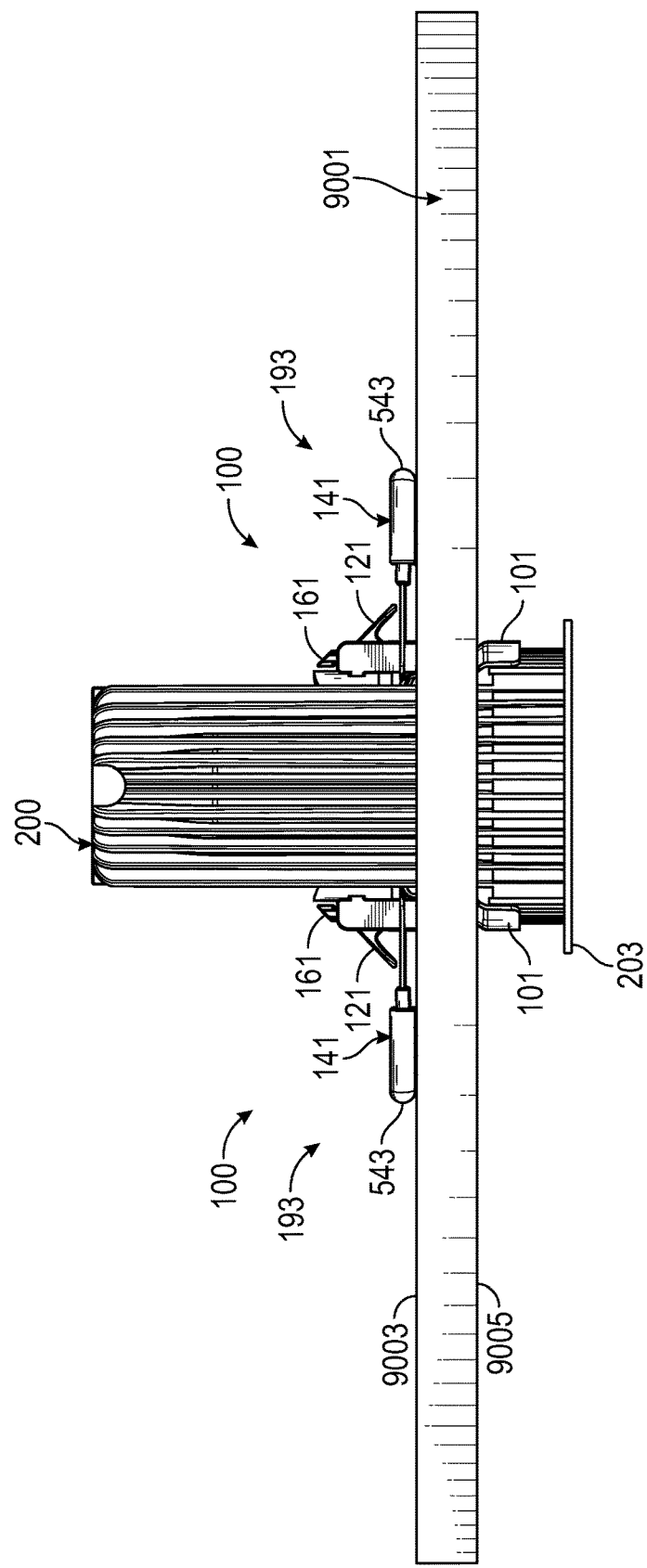

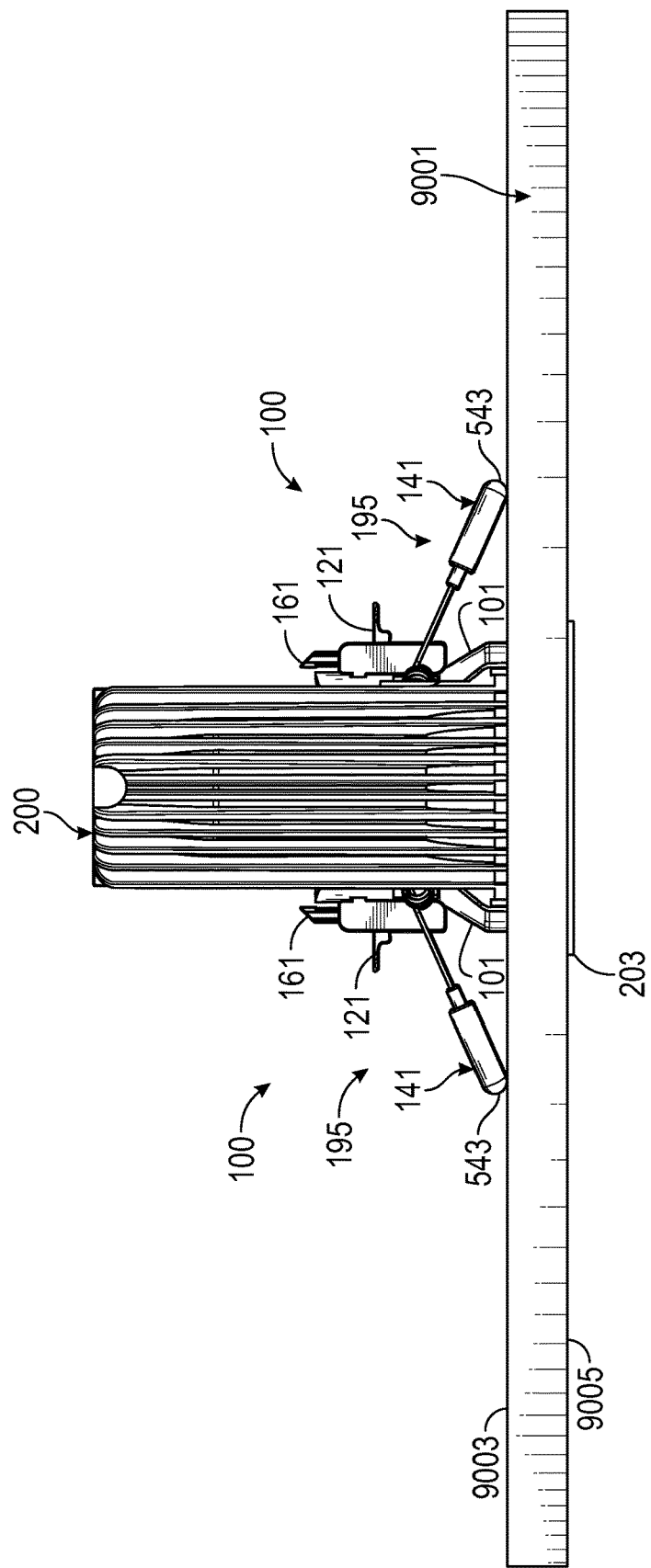

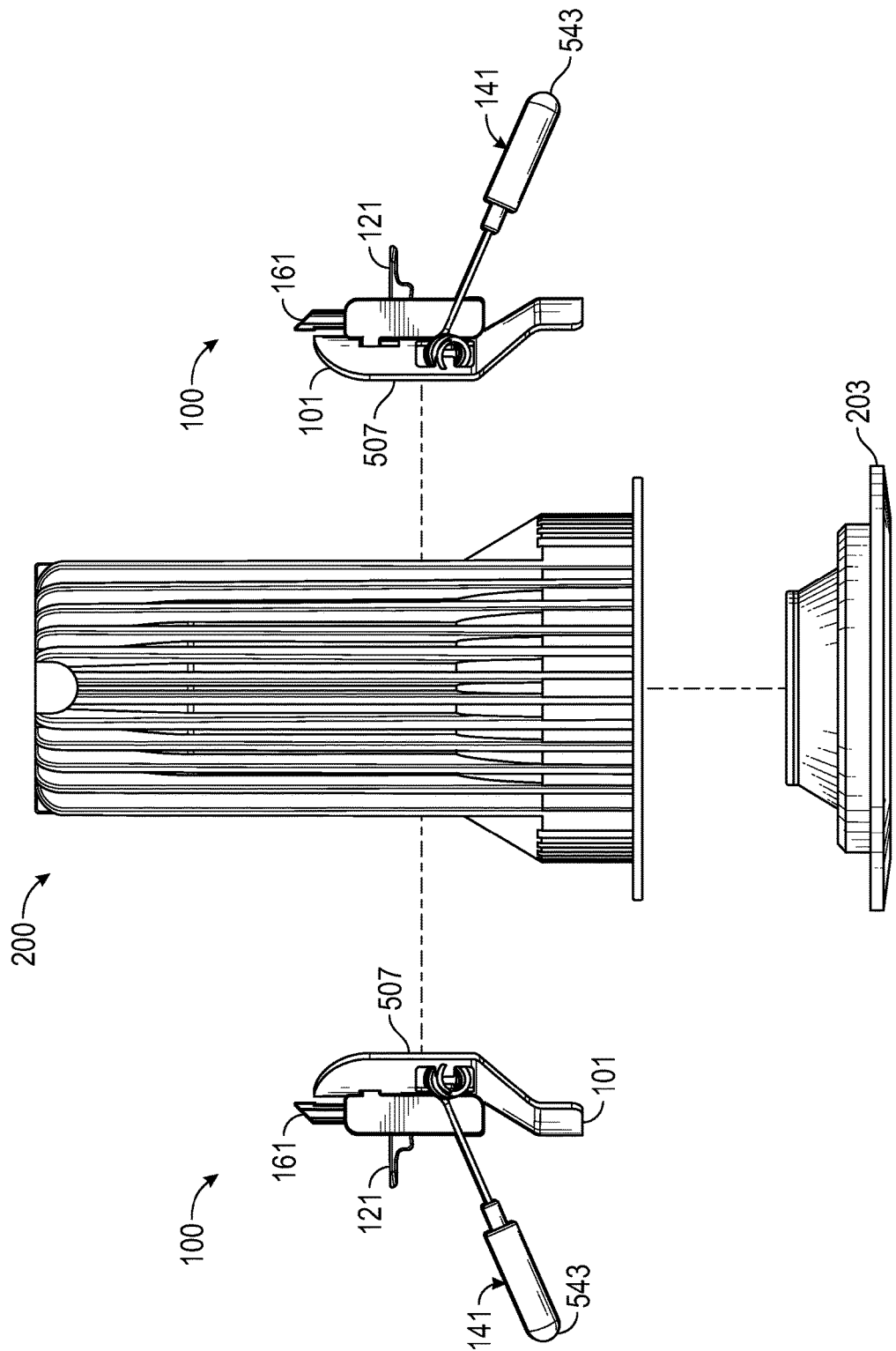

CEILING TRIGGERED SPRING CLIP FOR LIGHTING MODULE INSTALL

TECHNICAL FIELD OF THE INVENTION

The present invention relates in general to torsion spring clips used to install lighting modules and more specifically to a pre-loadable open configuration trigger-spring-clip that may be ceiling triggered for lighting module install.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Presently (circa 2016), light modules with a pair of opposing spring clips for installation into a receiving hole in a ceiling are commercially available. For example, such products include: a Gama Illuminer product number GM-LB4065S; a LED lighting module, with "spring buckles" made available by TorchStar Lighting, model number TS061; and a LED lighting module, with "spring clips" made available by OMAI Lighting, Product Code OMSZCD08W01WW. Once such a lighting module with the pair of opposing springs clips is installed the opposing spring clips, via torsion, may grab the ceiling. However, in all such lighting module examples, such spring clips, which include a torsion spring, are presented for installation with the spring clips in an already sprung state, meaning the installer must press each spring clip into an open configuration, which generally requires use of both hands, while the lighting module is then pushed into a receiving hole in the ceiling. Further, when the installer is installing multiple lighting modules and overhead, applying such constant pressure and using both hands to keep the spring clips open during install results in installer fatigue. Also, because installation is generally overhead, ladders are often used, and use of two hands for lighting module install while on a ladder increase risk of falling to the installer.

It would be desirable if such spring clips were pre-loaded into the open configuration and maintained in that pre-loaded open configuration until triggered to close by natural install mechanics of pushing the light module in the receiving hole in the ceiling. Such equipped lighting modules would then require only one hand to install. Such equipped lighting modules, would make install easier, faster, more efficient, and safer for the installer.

There is a need in the art for a spring clip apparatus that may be attached to a lighting module, wherein a spring clip of the spring clip apparatus may be pre-loaded into an open configuration and maintained in that pre-loaded open configuration install natural install mechanics trigger closing of the spring clip. That is, there is a need in the art for such a spring clip apparatus wherein that spring clip apparatus may be a trigger-release-clip apparatus.

It is to these ends that the present invention has been developed.

BRIEF SUMMARY OF THE INVENTION

To minimize the limitations in the prior art, and to minimize other limitations that will be apparent upon reading and understanding the present specification, the present invention describes a preloadable trigger-release-clip that may be ceiling triggered for lighting module installation. Systems and methods of use are also described. In some embodiments, the trigger-release-clip may comprise a base-plate, a trigger, a clip, and a stop. In some embodiments, the base-plate may be a structural member that may attach to a lighting module. In some embodiments, the trigger may be in communication with the base-plate. The clip, with a torsion-spring, may be in communication with the base-plate. In some embodiments, the stop may be in communication with the trigger. In some embodiments, the stop may be in removable communication with the clip. In some embodiments, the trigger-release-clip may exist in a pre-loaded configuration and in a final configuration. In some embodiments, in the pre-loaded configuration, the stop may be in an up position that prevents the clip from actuating. In some embodiments, in the pre-loaded configuration, a terminal end of the clip may be proximate to some portion of the lighting module. In some embodiments, in the final configuration, the stop has been retracted into a down position by the trigger being depressed by a bottom of a ceiling that may allow the clip to actuate, such that a terminal end of the clip pivots away from the some portion of the lighting module to grab a top of the ceiling securing the lighting module to the ceiling.

It is an objective of the present invention to provide a trigger-release-clip that may be attached to a lighting module.

It is another objective of the present invention to provide a trigger-release-clip that may be pre-loaded into a configuration wherein a clip with torsion-spring may be maintained in an open configuration until natural install mechanics trigger closure of the clip with torsion-spring. Such natural install mechanics may include pushing the lighting module with attached trigger-release-clip into a receiving hole in a ceiling.

It is another objective of the present invention to provide a trigger-release-clip that may be installed into the receiving hole of the ceiling with only use of one hand of the installer.

It is another objective of the present invention to provide a trigger-release-clip that may be faster to use in installing lighting modules compared against existing lighting modules with spring clips.

It is another objective of the present invention to provide a trigger-release-clip that may be easier to use in installing lighting modules compared against existing lighting modules with spring clips.

It is another objective of the present invention to provide a trigger-release-clip that may generate less installer fatigue compared against existing lighting modules with spring clips.

It is another objective of the present invention to provide a trigger-release-clip that may be more efficient to use in installing lighting modules compared against existing lighting modules with spring clips.

It is yet another objective of the present invention to provide a trigger-release-clip that may be safer for the installer to use while the installer is working overhead and/or while the installer is on a ladder as compared against existing lighting modules with spring clips.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

FIG. 1B may depict the pair of trigger-release-clips mounted to the lighting module from FIG. 1A, wherein the trigger-release-clips may be in a transitional configuration, shown from the same cross-sectional side view through the planar-member.

FIG. 1C may depict the pair of trigger-release-clips mounted to the lighting module from FIG. 1A, wherein the trigger-release-clips may be in a final configuration, shown from the same cross-sectional side view through the planar-member.

FIG. 3B may depict the pair of trigger-release-clips exploded away from the lighting module of FIG. 2A, wherein the trigger-release-clips may be in the final configuration, shown from an exploded side view (right or left).

Figure 1A:
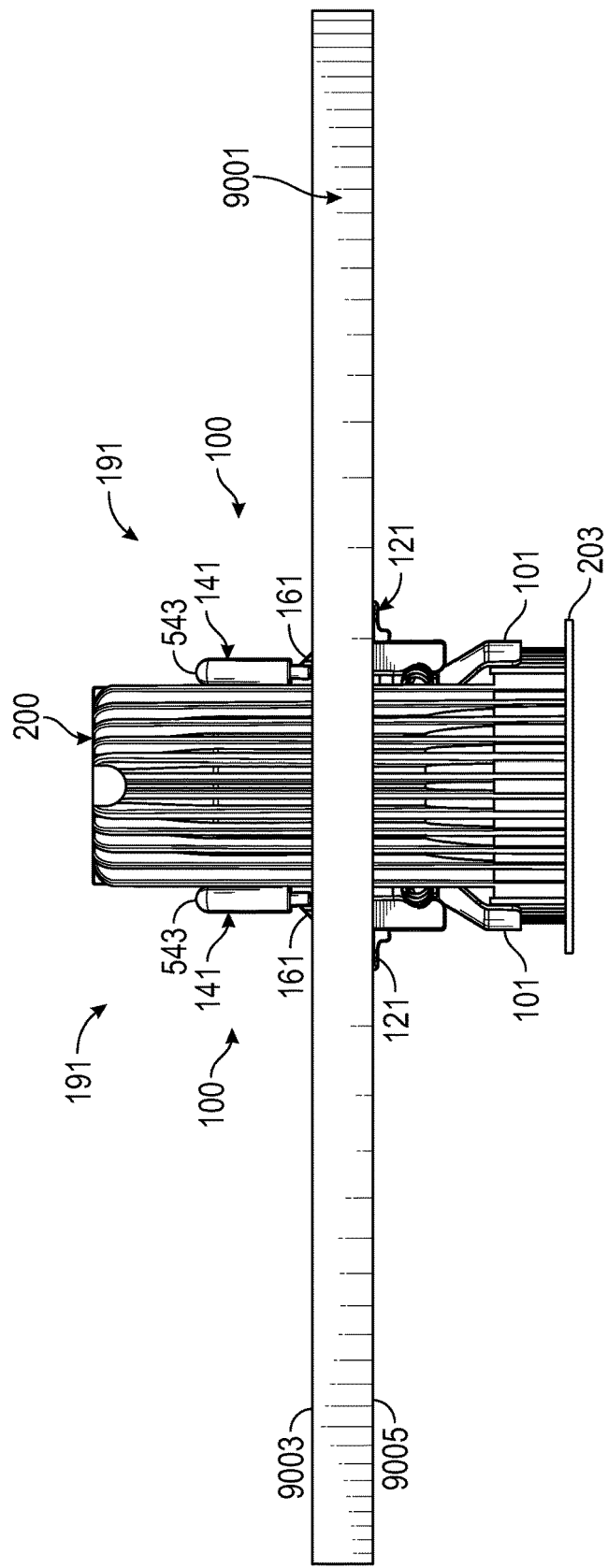
FIG. 1A may depict a pair of trigger-release-clips mounted to a lighting module, wherein the trigger-release-clips may be used to mount the lighting module to a planar-member, wherein the trigger-release-clips may be in a pre-loaded configuration, shown from a cross-sectional side view through the planar-member.

REFERENCE NUMERALS 100 trigger-release-clip 100
101 base-plate 101
121 trigger 121
141 clip 141
161 stop 161
191 pre-loaded configuration 191
193 transitional configuration 193
195 final configuration 195
200 lighting module 200
201 trigger-release-clip-receivers 201
201a slot 201a
203 flange 203
301 receiving-hole 301
431 cavity 431
503 torsion-spring-receivers 503
505 lighting-module-attachment-means 505
505a receiving-hole 505a
505b mounting-screw 505b
507 flange 507
509 trigger-subassembly-receivers 509
523 trigger-holder 523
525 trigger-receiving-grooves 525
527 trigger-spring-mount-receiver 527
529 base-plate-mount 529
531 tab 531
543 terminal end 543
544 second terminal end 544

545 torsion-spring 545
547 spring-coils 547
549 bumper 549
551 bumper-frame 551
563 stop-flange 563
565 trigger-spring-mount 565
567 stop-return-spring 567
569 trigger-spring 569
661 up position 661
761 down position 761
900 method 900
901 inspection of receiving hole 901
903 fix and/or cleanup receiving hole 903
905 check if trigger-release-clip attached to lighting module 905
907 attach trigger-release-clip to lighting module 907
909 make electrical connections 909
911 check for pre-loaded configuration 911
913 place into pre-loaded configuration 913
921 start 921
923 start receiving push 923
925 continue receiving push 925
927 continue receiving push until flange is flush 927
9001 planar-member 9001
9003 top 9003
9005 bottom 9005

DETAILED DESCRIPTION OF THE INVENTION

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

FIG. 1A may depict a pair of trigger-release-clips 100 mounted to a lighting module 200, wherein trigger-release-clips 100 may be used to mount lighting module 200 to a planar-member 9001, wherein the trigger-release-clips 100 may be in a pre-loaded configuration 191, shown from a cross-sectional side view through planar-member 9001.

FIG. 1B may depict the pair of trigger-release-clips 100 mounted to lighting module 200, wherein trigger-release-clips 100 may be in a transitional configuration 193, shown from the same cross-sectional side view through planar-member 9001.

FIG. 1C may depict the pair of trigger-release-clips 100 mounted to lighting module 200, wherein trigger-release-clips 100 may be in a final configuration 195, shown from the same cross-sectional side view through planar-member 9001.

In some embodiments, FIG. 1A, FIG. 1B, and FIG. 1C, together may then depict at least two operational configurations of a given trigger-release-clip 100, that of pre-loaded configuration 191 (see e.g., FIG. 1A) and that of final configuration 195 (see e.g., FIG. 1C). In some embodiments, FIG. 1B depicting transitional configuration 193 may simply be one depiction, from a single moment in time, of trigger-release-clips 100, in motion, as the trigger-release-clips 100 transitions from pre-loaded configuration 191 to final configuration 195.

In some embodiments, when trigger-release-clips 100 may be in final configuration 195, e.g., as shown in FIG. 1C, some portion a terminal end 543 of a clip 141 of each trigger-release-clip 100 may be exerting some squeeze pressure against a top 9003 of planar-member 9001; which may also cause lighting module 200 to then be securely mounted to planar-member 9001 by flange 203 of lighting module 200 squeezing against a bottom 9005 of planar-member 9001.

Note, in some embodiments, planar-member 9001 may be a ceiling or a portion of a ceiling or a frame of a lighting fixture or a portion of a frame of a lighting fixture or the like. In some embodiments, planar-member 9001 may be substantially planar. In some embodiments, planar-member 9001 may be substantially flat. In some embodiments, planar-member 9001 may comprise top 9003 and bottom 9005; wherein top 9003 may be opposing bottom 9005. See e.g., FIG. 1A, FIG. 1B, and FIG. 1C. In some embodiments, a given lighting module 200 may be mounted through a hole in planar-member 9001, as in recessed lighting applications. For example, and without limiting the scope of the present invention, as shown in FIG. 1A, FIG. 1B, and in FIG. 1C, lighting module 200 with the two opposing trigger-release-clips 100 may be passing through a hole within planar-member 9001.

Continuing discussing FIG. 1A, FIG. 1B, and FIG. 1C, in some embodiments, trigger-release-clip 100 for mounting a given lighting module 200 to planar-member 9001 may comprise: a base-plate 101, a trigger 121, clip 141, and a stop 161. In some embodiments, base-plate 101 may be a structural member that may be attached to the given lighting module 200. In some embodiments, trigger 121 may be in communication with base-plate 101. In some embodiments, trigger 121 may also be a structural member (but a different structural member from that of base-plate 101). In some embodiments, a nature of communication between trigger 121 and base-plate 101 may be indirect communication through an intermediary, a trigger-subassembly (see FIG. 5A and FIG. 5B for such a trigger-subassembly). In some embodiments, clip 141 may be in communication with base-plate 101. In some embodiments, clip 141 may comprise terminal end 543. In some embodiments, stop 161 may be in communication with trigger 121. In some embodiments, stop 161 may be in removable communication with clip 141. In some embodiments, trigger-release-clip 100 may exist in the at least two configurations, pre-loaded configuration 191 and final configuration 195. In some embodiments, in pre-loaded configuration 191, stop 161 may be in communication with clip 141. In some embodiments, in pre-loaded configuration 191, trigger 121 may be positioned to keep stop 161 in an "up position 661" that may prevent clip 141 from actuating and may keep terminal end 543 of clip 141 proximate to a portion of lighting module 200. See e.g., FIG. 1A. In some embodiments, clip 141 may under torsion. In some embodiments, this proximate distance from terminal end 543 to the portion of lighting module 200, while trigger-release-clip 100 may be in the pre-loaded configuration 191 (with stop 161 in the up position 661) may be one inch or less, including a zero proximate distance for embodiments where terminal end 543 may be touching the portion of lighting module 200. In some embodiments, stop 161 while in up position 661 may physically prevent clip 141 from acting under this torsion. See e.g., FIG. 1A.

Continuing discussing FIG. 1C, in final configuration 195, trigger 121 may have been depressed causing stop 161 to transition (e.g., retract) into a "down position 761" that may have allowed clip 141 to actuate and may allow terminal end 543 of clip 141 to pivot away from the portion of lighting module 200. In some embodiments, under proper operating conditions, in final configuration 195, terminal end 543 may be in physical contact with top 9003 of planar-member 9001.

Continuing discussing FIG. 1A, FIG. 1B, and FIG. 1C, in some embodiments, it may be bottom 9005 of planar-member 9001 that may trigger depression of trigger 121, when an installer pushes lighting module 200, with two trigger-release-clips 100, in pre-loaded configuration 191, through the hole in planar-member 9001. And once trigger 121 may be depressed by coming into physical contact with bottom 9005 causing stop 161 to be in down position 761 (see e.g., FIG. 1B, FIG. 7A, and FIG. 7B), stop 161 may be retracted sufficiently such that stop 161 is now longer preventing motion of clip 141, and the torsion may then cause clip 141 to pivot downwards, such that terminal end 543 comes into physical contact with top 9003 of planar-member 9001. It may also be noted in some embodiments, once trigger 121 is no longer being depressed, stop 161 may return to up position 661, see e.g., FIG. 1C.

Figure 2A:
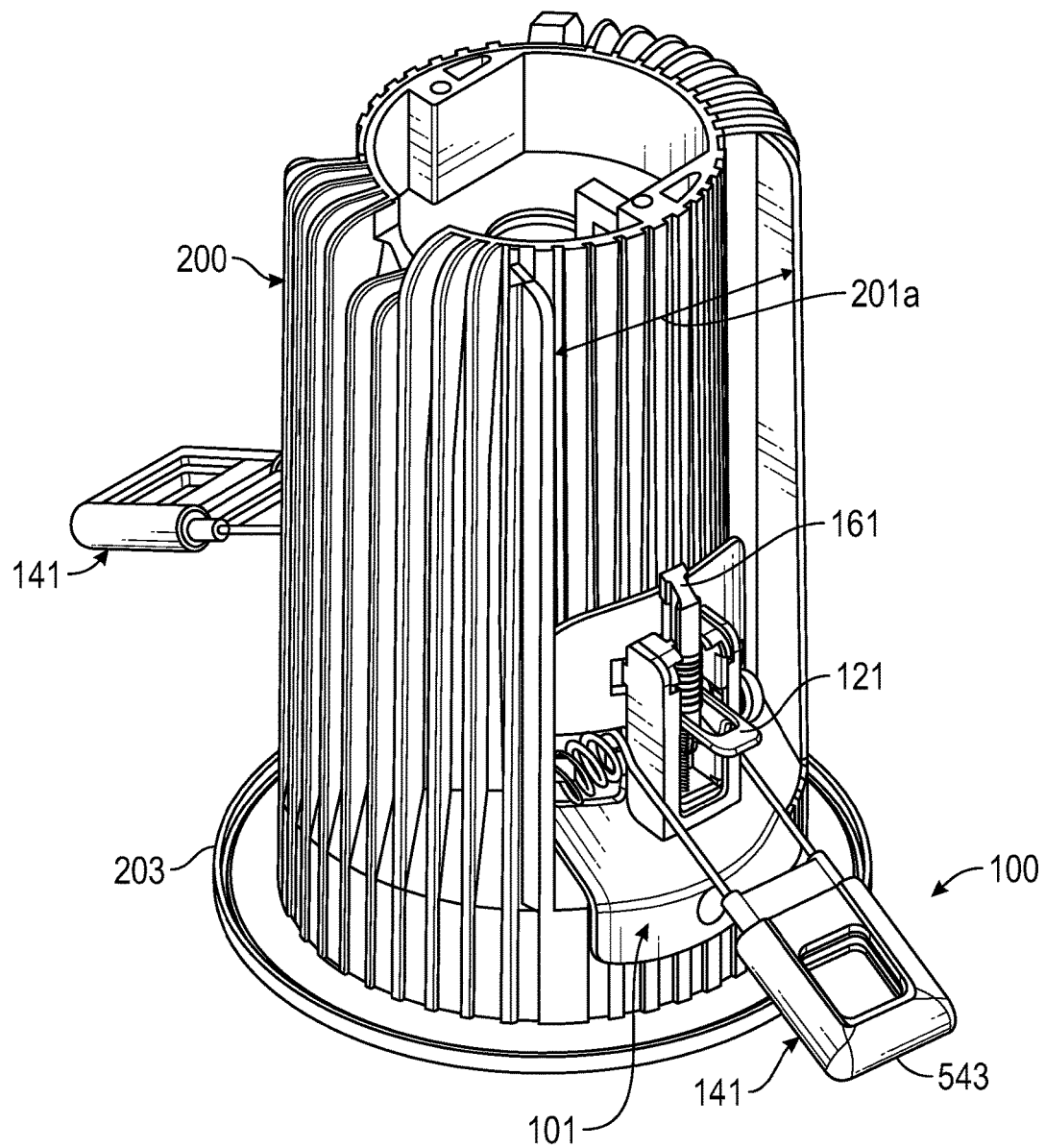
FIG. 2A may depict the pair of trigger-release-clips mounted to the lighting module from FIG. 1A, wherein the trigger-release-clips may be in the final configuration, shown from a perspective view. The planar-member is not depicted in FIG. 2A.

FIG. 2A may depict the pair of trigger-release-clips 100 mounted to lighting module 200, wherein trigger-release-clips 100 may be in final configuration 195, shown from a perspective view.

Figure 2B:
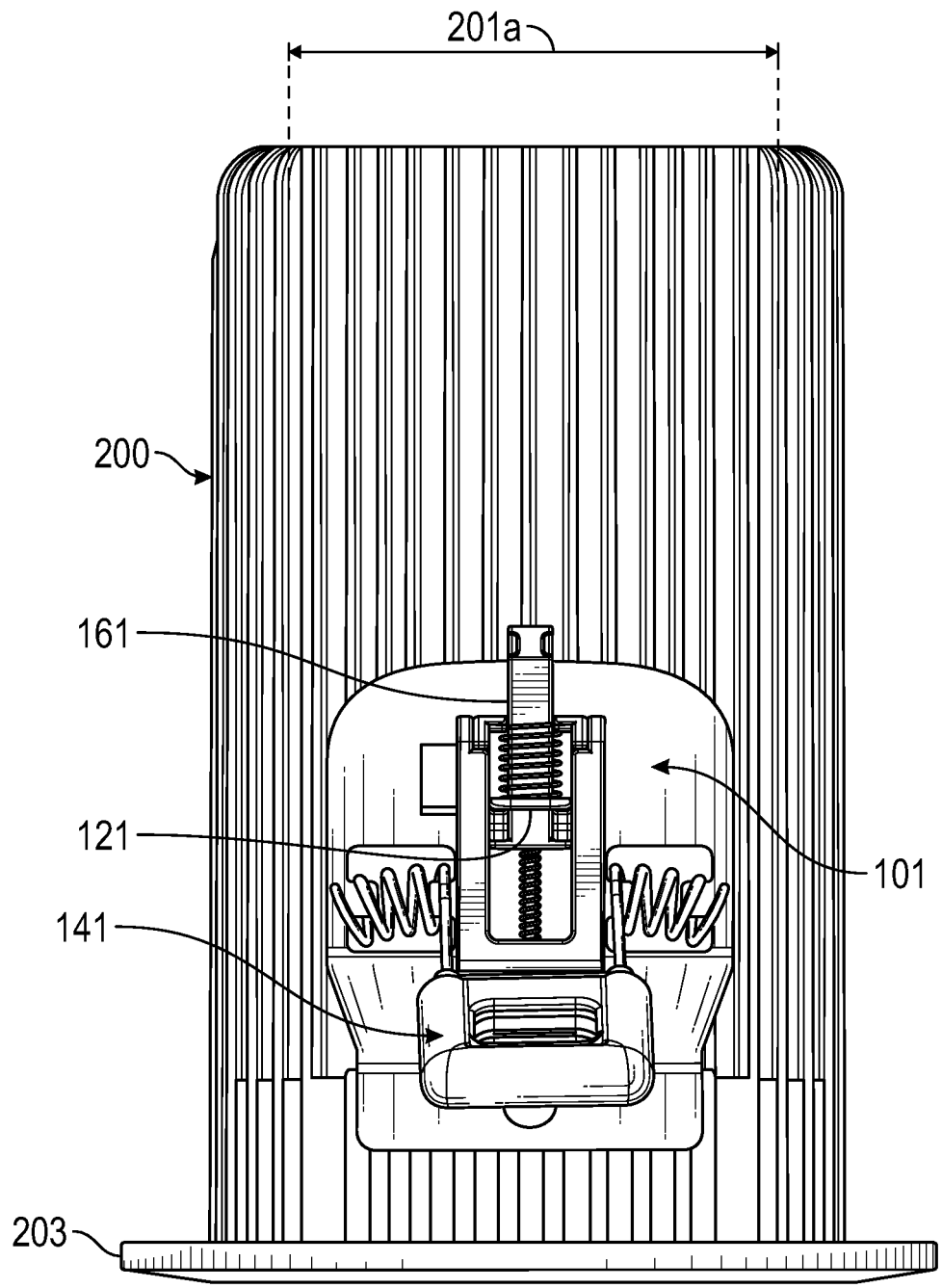
FIG. 2B may depict the pair of trigger-release-clips mounted to the lighting module from FIG. 2A, wherein the trigger-release-clips may be in the final configuration, shown from a front view (or a back view). The planar-member is not depicted in FIG. 2B.

FIG. 2B may depict the pair of trigger-release-clips 100 mounted to lighting module 200, wherein trigger-release-clips 100 may be in final configuration 195, shown from a front view (or a back view).

Figure 2C:
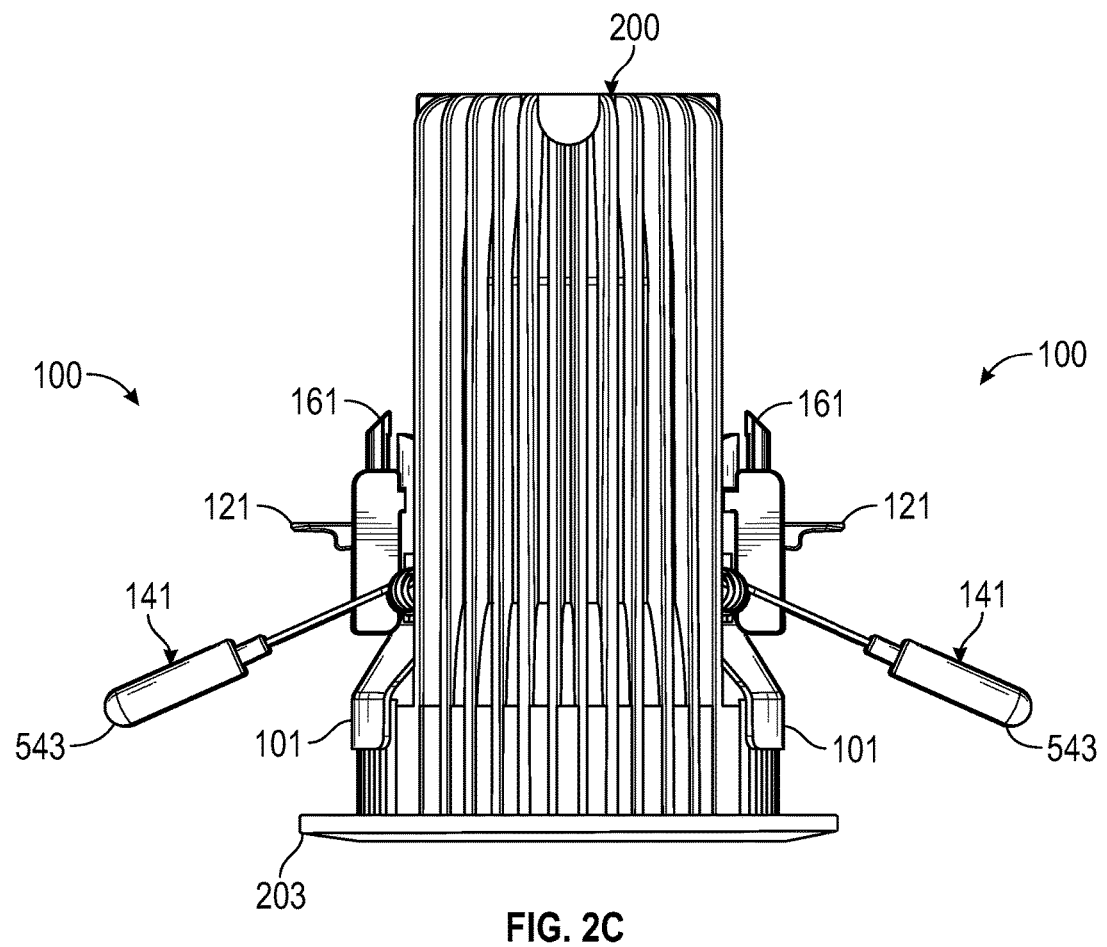
FIG. 2C may depict the pair of trigger-release-clips mounted to the lighting module from FIG. 2A, wherein the trigger-release-clips may be in the final configuration, shown from a side view (right or left). The planar-member is not depicted in FIG. 2B.

FIG. 2C may depict the pair of trigger-release-clips 100 mounted to lighting module 200, wherein trigger-release-clips 100 may be in final configuration 195, shown from a side view (right or left). (In some embodiments, a right side view or a left side view may be substantially equivalent due to radial symmetry of lighting module 200 from a top or a bottom view of lighting module 200.)

Figure 2D:
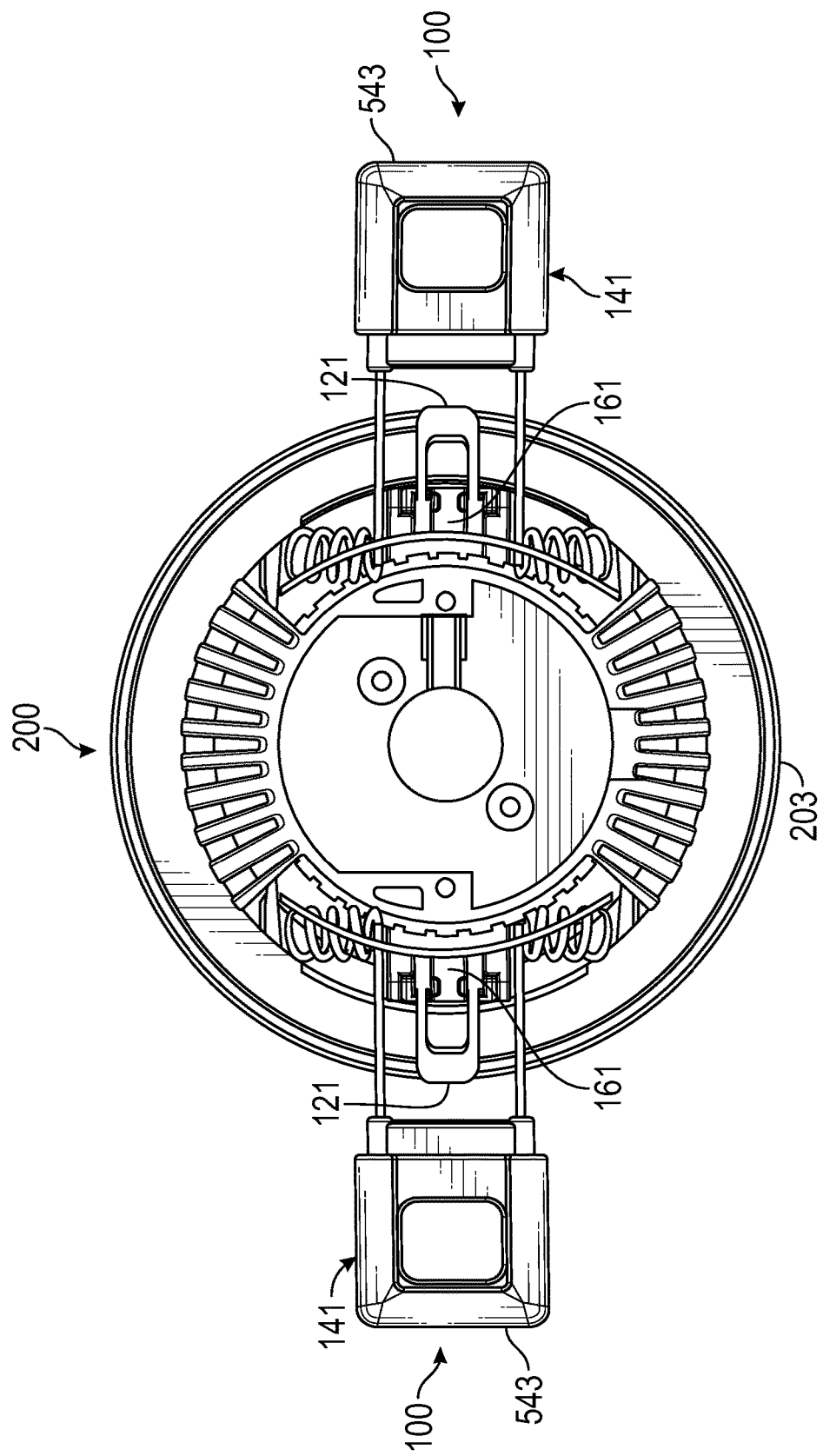
FIG. 2D may depict the pair of trigger-release-clips mounted to the lighting module from FIG. 2A, wherein the trigger-release-clips may be in the final configuration, shown from a top view. The planar-member is not depicted in FIG. 2B.

FIG. 2D may depict the pair of trigger-release-clips 100 mounted to lighting module 200, wherein trigger-release-clips 100 may be in final configuration 195, shown from a top view. In FIG. 2A, FIG. 2B, FIG. 2C, and in FIG. 2D, planar-member 9001 may not be depicted.

As shown in FIG. 2A, FIG. 2C, and in FIG. 2D, in some embodiments, there may be two substantially opposing trigger-release-clips 100 per a given lighting module 200.

Discussing, FIG. 2A, FIG. 2B, FIG. 2C, and in FIG. 2D, in some embodiments, lighting module 200 may comprise flange 203. In some embodiments, exterior portions of flange 203 may be visible once lighting module 200 may be installed in a hole in planar-member 9001 (e.g., the ceiling). Once lighting module 200 may be installed in the hole in planar-member 9001, flange 203 may cover over this hole, so the hole is no longer visible after installation. In some embodiments, once lighting module 200 may be installed in the hole in planar-member 9001, flange 203 may press up against bottom 9005 of planar-member 9001. See e.g., FIG. 1C. Continuing discussing, FIG. 2A, FIG. 2B, FIG. 2C, and in FIG. 2D, in some embodiments, flange 203 may be located at a terminal end of lighting module 200, i.e., the terminal end which is intended to emit light.

Continuing discussing, FIG. 2A, FIG. 2B, FIG. 2C, and in FIG. 2D, in some embodiments, lighting module 200 may comprise at least one trigger-release-clip-receivers 201. In some embodiments, trigger-release-clip-receiver 201 may be structure for receiving trigger-release-clip 100. In some embodiments, lighting module 200 may comprise two substantially opposing trigger-release-clip-receivers 201. In some embodiments, trigger-release-clip-receiver 201 may be selected from one or more of: slot 201a and/or receiving-hole 301. For example, and without limiting the scope of the present invention, slots 201a may be shown in FIG. 2A and in FIG. 2B; and receiving-hole 301 may be shown in FIG. 3A. Continuing discussing FIG. 2A and FIG. 2B, in some embodiments, a given lighting module 200 may comprise two substantially opposing slots 201a. In some embodiments, slots 201a may run substantially parallel with a longitude (length) of lighting module 200. In some embodiments, a width of slot 201a may be sized to receive flanges 507 of base-plate 101.

Figure 3A:
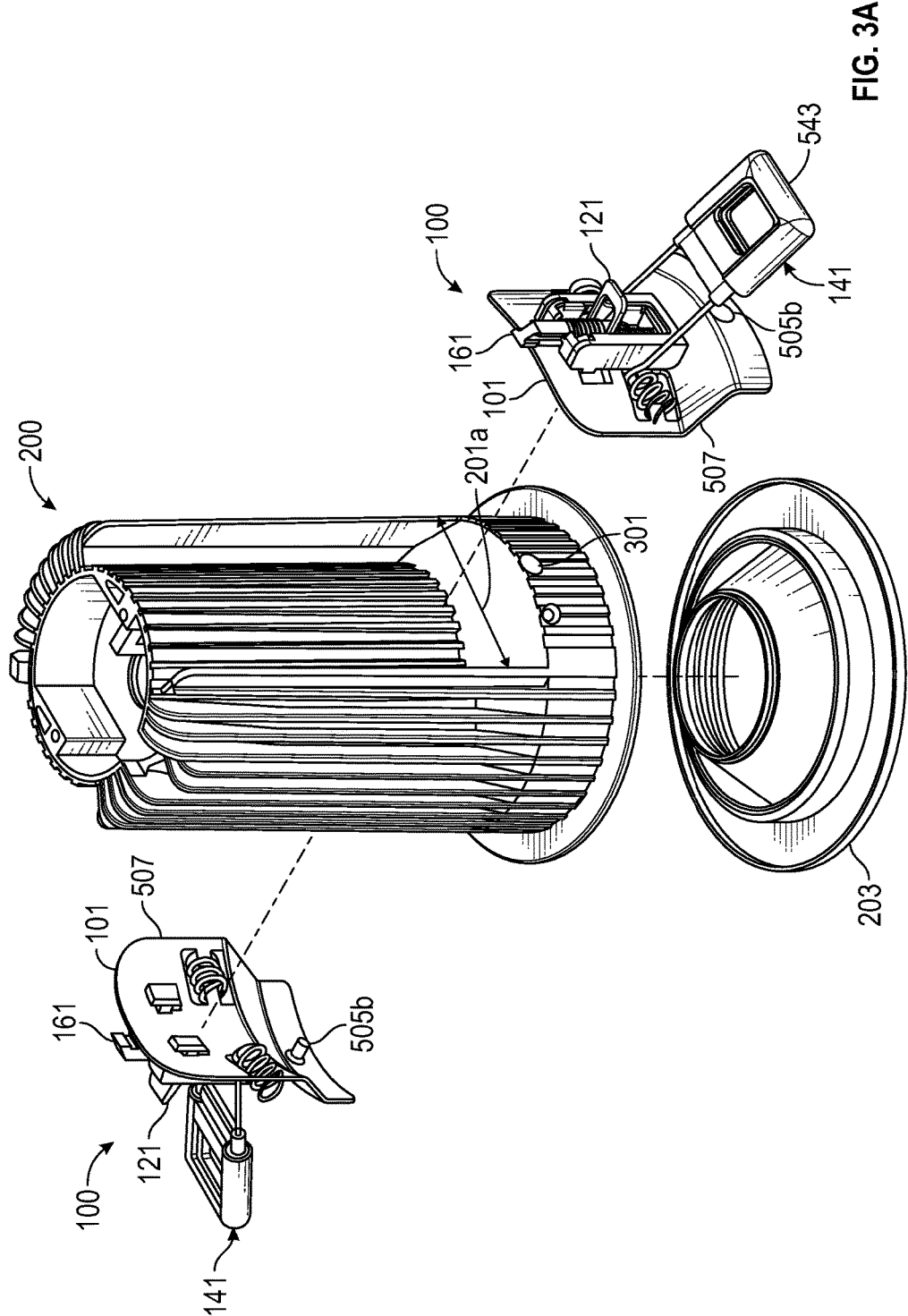
FIG. 3A may depict the pair of trigger-release-clips exploded away from the lighting module of FIG. 2A, wherein the trigger-release-clips may be in the final configuration, shown from an exploded perspective view.

FIG. 3A may depict the pair of trigger-release-clips 100 exploded away from lighting module 200, wherein trigger-release-clips 100 may be in final configuration 195, shown from an exploded perspective view.

FIG. 3B may depict the pair of trigger-release-clips 100 exploded away from lighting module 200, wherein trigger-release-clips 100 may be in final configuration 195, shown from an exploded side view (right or left). (In some embodiments, a right side view or a left side view may be substantially equivalent due to radial symmetry of lighting module 200 from a top or a bottom view of lighting module 200.)

FIG. 3A may depict receiving-hole 301 of lighting module 200. In some embodiments, lighting module 200 may comprise at least one trigger-release-clip-receiver 201; and in some embodiments, the at least one trigger-release-clip-receiver 201 may be receiving-hole 301. In some embodiments, receiving-hole 301 may be sized to receive complimentary mounting-screw 505b; wherein mounting-screw 505b may be an example of lighting-module-attachment-means 505 of base-plate 101. In some embodiments, receiving-hole 301 may be complimentary threaded to receive complimentary threaded mounting-screw 505b.

In some embodiments, receiving-hole 301 and mounting-screw 505b may be replaced with other well-known attachment hardware and/or fastening means, such as, but not limited to: a bolt and a bolt receiving hole, a rivet, a frictional press fit; a snap fit; a barbed snap fit; a flange and a receiving groove; VELCRO or the like; and/or adhesive use.

In some embodiments, a nature of attachment between trigger-release-clip 100 and lighting module 200 may be permanent. In some embodiments, a nature of attachment between trigger-release-clip 100 and lighting module 200 may be removable.

In some embodiments, trigger-release-clip 100 may be an attached subassembly to lighting module 200.

Figure 4A:
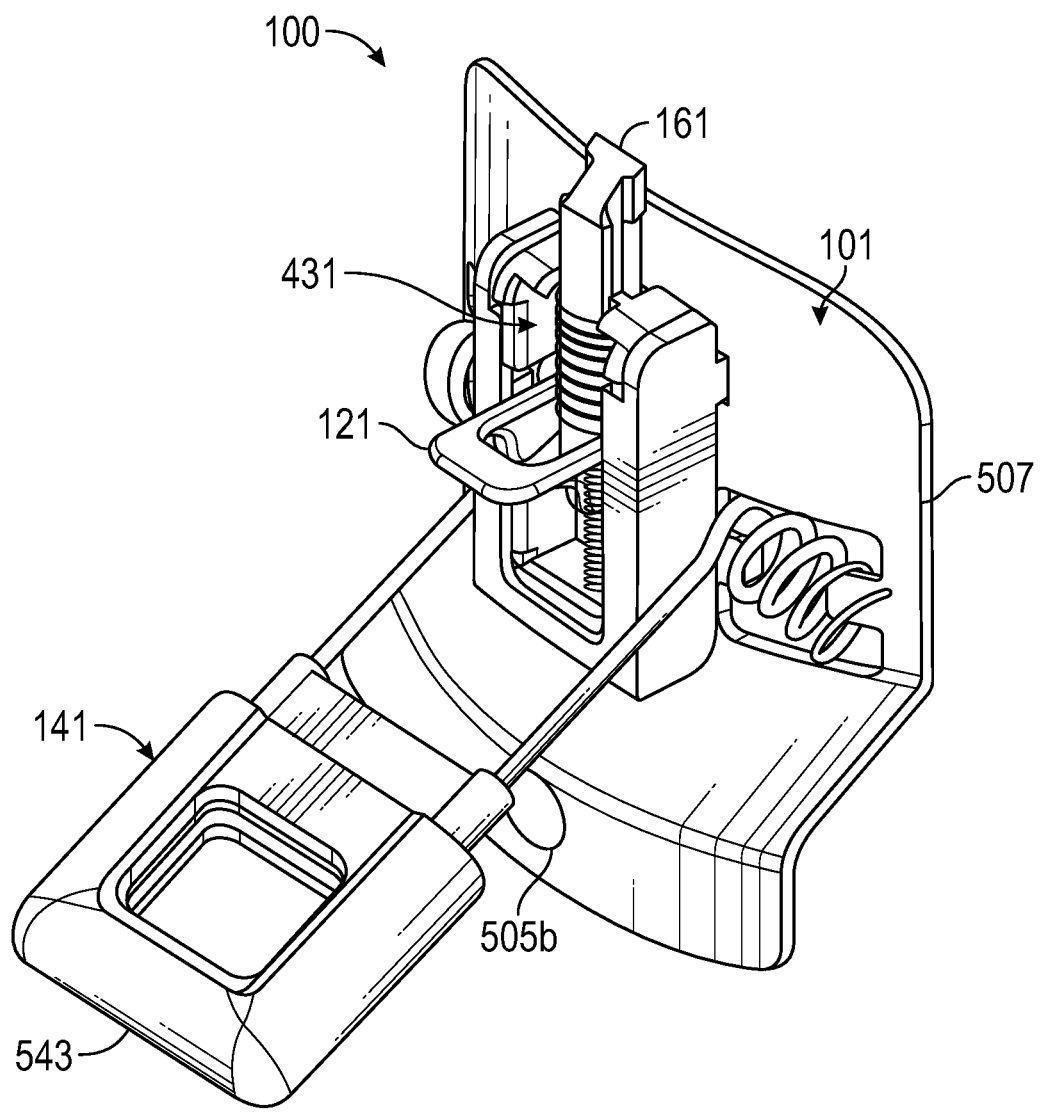
FIG. 4A may depict a single trigger-release-clip, wherein the trigger-release-clip may be in the final configuration, shown from a perspective view. The lighting module may not be shown in FIG. 4A.
Figure 4B:
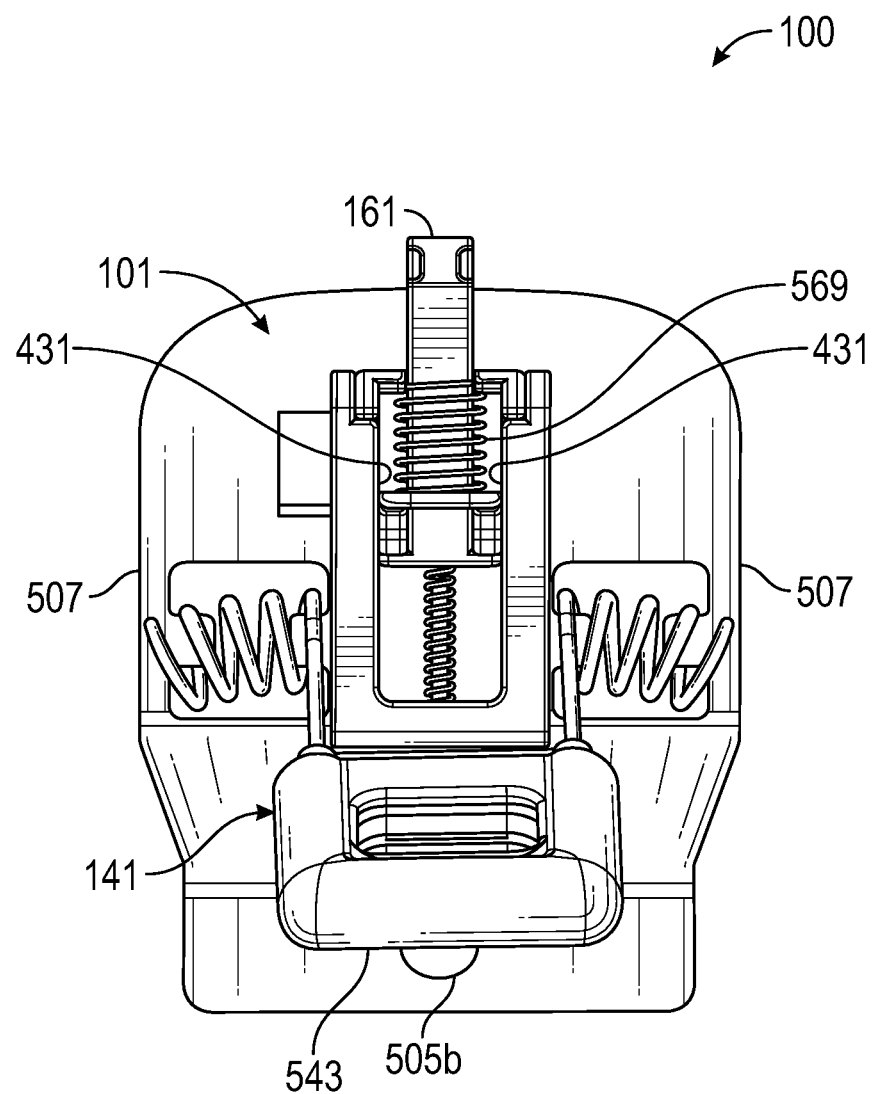
FIG. 4B may depict the trigger-release-clip of FIG. 4A, wherein the trigger-release-clip may be in the final configuration, shown from a front view. The lighting module may not be shown in FIG. 4B.
Figure 4C:
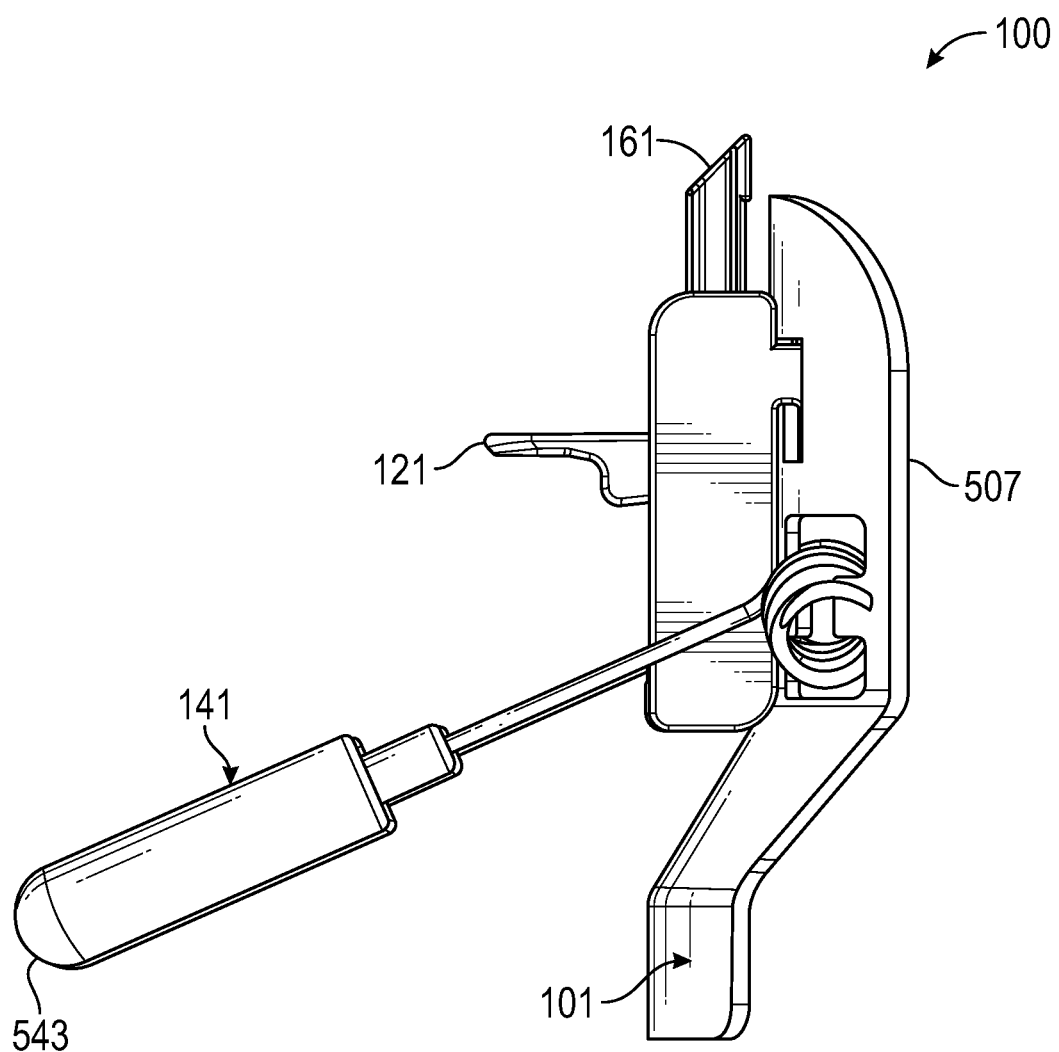
FIG. 4C may depict the trigger-release-clip of FIG. 4A, wherein the trigger-release-clip may be in the final configuration, shown from a side view (right or left). The lighting module may not be shown in FIG. 4C.

FIG. 4A may depict a single trigger-release-clip 100, wherein trigger-release-clip 100 may be in final configuration 195, shown from a perspective view. FIG. 4B may depict a single trigger-release-clip 100, wherein trigger-release-clip 100 may be in final configuration 195, shown from a front view. FIG. 4C may depict a single trigger-release-clip 100, wherein trigger-release-clip 100 may be in final configuration 195, shown from a side view (right or left). In FIG. 4A, FIG. 4B, and FIG. 4C, lighting module 200 and planar-member 9001 may not be shown. FIG. 4A, FIG. 4B, and FIG. 4C may show more detailed views (enlarged views) of trigger-release-clip 100 as compared against the prior figures discussed.

As noted above, in some embodiments, trigger-release-clip 100 for mounting lighting module 200 to planar-member 9001 may comprise: base-plate 101, trigger 121, clip 141, and stop 161. In some embodiments, base-plate 101 may be a structural member that may be attached to the given lighting module 200. In some embodiments, trigger 121 may be in communication with base-plate 101. In some embodiments, trigger 121 may also be a structural member (but a different structural member). In some embodiments, a nature of communication between trigger 121 and base-plate 101 may be indirect communication through an intermediary, a trigger-subassembly. In some embodiments, clip 141 may be in communication with base-plate 101. In some embodiments, clip 141 may comprise terminal end 543. In some embodiments, stop 161 may be in communication with trigger 121.

Discussing FIG. 4A, in some embodiments, 100 may comprise cavity 431. In some embodiments, cavity 431 may house portions of a stop-subassembly of stop 161. In some embodiments, cavity 431 may be structure formed from a trigger-subassembly of trigger 121. See also FIG. 4B for cavity 431.

Figure 5A:
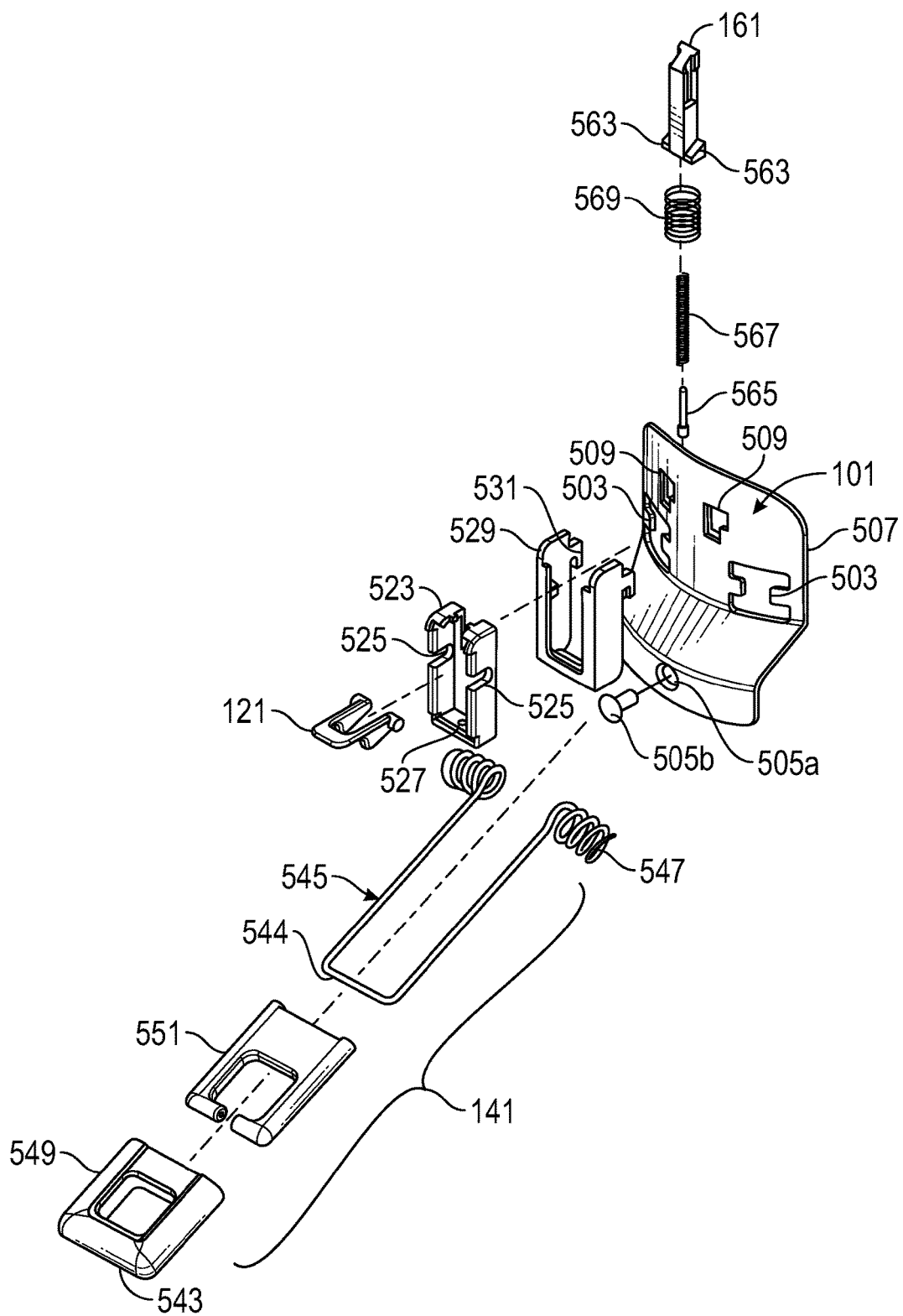
FIG. 5A may depict a single trigger-release-clip, shown from an exploded perspective view.
Figure 5B:
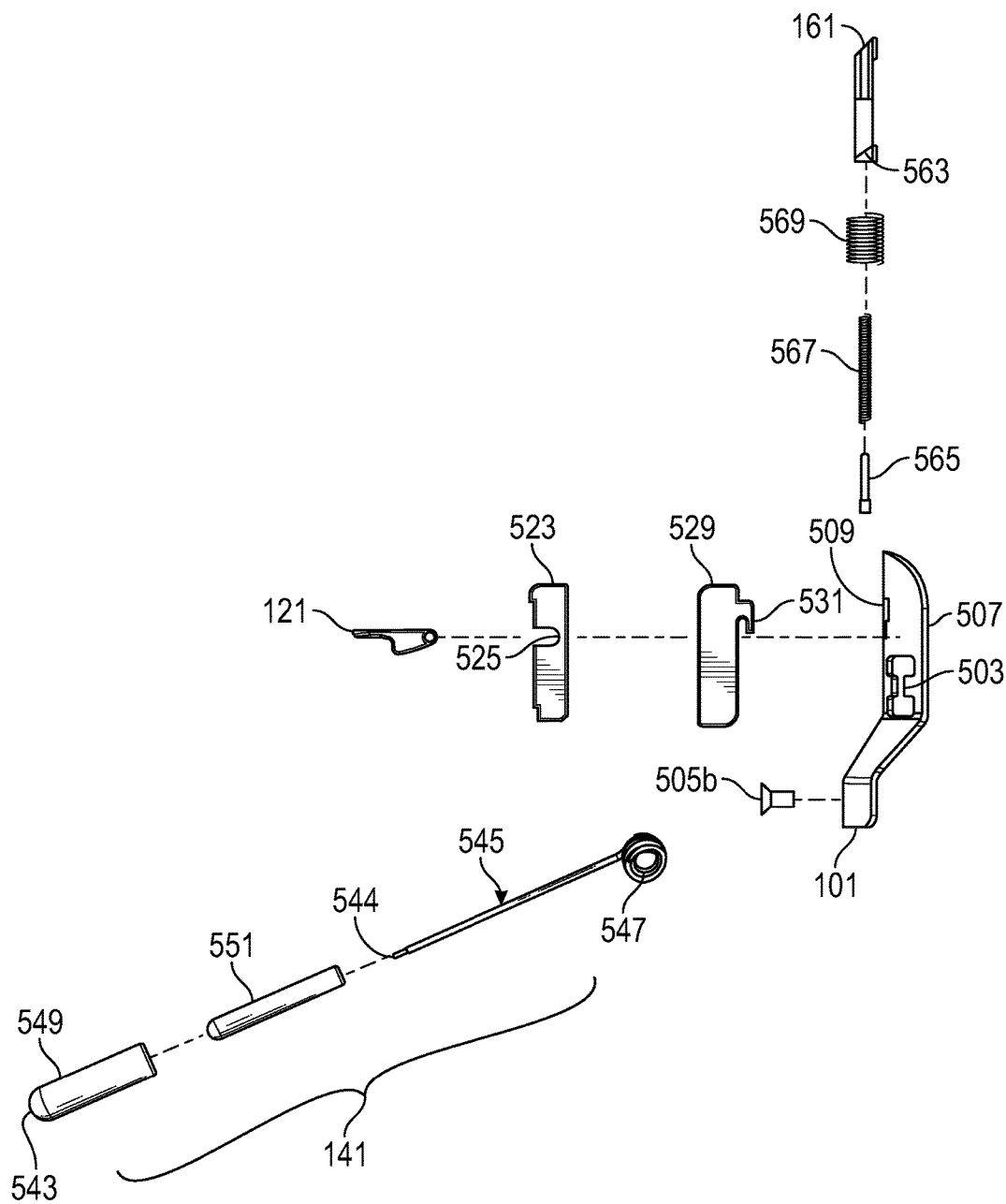
FIG. 5B may depict the single trigger-release-clip of FIG. 5A, shown from an exploded side view (right or left).

FIG. 5A may depict a single trigger-release-clip 100, shown from an exploded perspective view. FIG. 5B may depict the single trigger-release-clip 100, shown from an exploded side view (right or left).

In some embodiments, trigger-release-clip 100 for mounting lighting module 200 to planar-member 9001 may comprise: base-plate 101, trigger 121, clip 141, and stop 161. In some embodiments, base-plate 101 may be a structural member that may be attached to the given lighting module 200. In some embodiments, trigger 121 may be in communication with base-plate 101. In some embodiments, trigger 121 may also be a structural member (but a different structural member). In some embodiments, a nature of communication between trigger 121 and base-plate 101 may be indirect communication through an intermediary, a trigger-subassembly. In some embodiments, clip 141 may be in communication with base-plate 101. In some embodiments, clip 141 may comprise terminal end 543. In some embodiments, stop 161 may be in communication with trigger 121.

In some embodiments, base-plate 101 may be substantially constructed from one or more rigid materials of construction. In some embodiments, base-plate 101 may be constructed from a metal. In some embodiments, base-plate 101 may be constructed from steel. In some embodiments, base-plate 101 may be constructed from a thermoplastic; and may include additional ribbing structures for additional strength and/or fillers for strength, such as, but not limited to, glass fibers.

Discussing FIG. 5A and FIG. 5B, in some embodiments, base-plate 101 may comprise opposing pairs of torsion-spring-receivers 503 for receiving a torsion-spring 545 of the clip 141. In some embodiments, torsion-spring-receivers 503 may comprise cutouts with tab into planar structure of base-plate 101; wherein these tabs may provide anchoring structure for spring-coils 547 of torsion-spring 545 to attach to.

Continuing discussing FIG. 5A and FIG. 5B, in some embodiments, base-plate 101 may comprise a lighting-module-attachment-means 505 (see e.g., 505a, 505b, and/or 507). In some embodiments, lighting-module-attachment-means 505 may provide structure for attaching base-plate 101 to lighting module 200. In some embodiments, the lighting-module-attachment-means 505 may comprise a receiving-hole 505a in base-plate 101 and a mounting-screw 505b, wherein a portion of the mounting-screw 505b may pass through receiving-hole 505a and engage a further receiving hole (e.g., receiving-hole 301) in lighting module 200. In some embodiments, the lighting-module-attachment-means 505 may comprise opposing pairs of flanges 507; wherein the opposing pairs of flanges 507 may slidingly fit into a slot (e.g., slot 201a) of lighting module 200. In some embodiments, flanges 507 may be located along sides (not top nor bottom) of base-plate 101.

Continuing discussing FIG. 5A and FIG. 5B, in some embodiments, base-plate 101 may comprise trigger-subassembly-receivers 509 for receiving a trigger-subassembly of trigger 121. In some embodiments, trigger-subassembly-receivers 509 may be spaced cutouts in the otherwise planar structure of base-plate 101, wherein these cutouts are sized to receive tabs 531 of base-plate-mount 529 of the trigger-subassembly of trigger 121.

Continuing discussing FIG. 5A and FIG. 5B, in some embodiments, trigger 121 may comprise a trigger-subassembly. In some embodiments, trigger-release-clip 100 may comprise the trigger-subassembly. In some embodiments, the trigger subassembly may comprise a trigger-holder 523 and a base-plate-mount 529. In some embodiments, the trigger subassembly may comprise trigger 121, trigger-holder 523, and base-plate-mount 529.

Continuing discussing FIG. 5A and FIG. 5B, in some embodiments, trigger 121 may be pivotally attached to trigger-holder 523. In some embodiments, trigger-holder 523 may comprise a pair of trigger-receiving-grooves 525, which may receive opposing prongs of trigger 121; wherein these opposing prongs of trigger 121 may be located on an end of trigger 121 to be attached to trigger-holder 523 at trigger-receiving-grooves 525. In some embodiments, trigger-holder 523 may be attached (e.g., fixedly in some embodiments) to base-plate-mount 529. In some embodiments, base-plate-mount 529 may be attached (e.g., fixedly in some embodiments) to base-plate 101 at trigger-subassembly-receivers 509 of base-plate 101. In some embodiments, on a back side of base-plate-mount 529 may be one or more protruding tabs 531. In some embodiments, tabs 531 may be received at trigger-subassembly-receivers 509 of base-plate 101. In some embodiments, when trigger-holder 523 may be attached to base-plate-mount 529, cavity 431 may be formed as shown in FIG. 4A (and FIG. 4B).

Continuing discussing FIG. 5A, in some embodiments, trigger-holder 523 may comprise trigger-spring-mount-receiver 527 for receiving a trigger-spring-mount 565 of a stop-subassembly of stop 161. In some embodiments, trigger-spring-mount-receiver 527 may be a hole or pocket for capturing a bottom end of trigger-spring-mount 565. In some embodiments, trigger-spring-mount-receiver 527 may be located at a bottom of 523. See e.g., FIG. 5A.

In some embodiments, trigger 121, trigger-holder 523, and/or base-plate-mount 529 may each be a structural member, i.e., different structural members. In some embodiments, trigger 121, trigger-holder 523, and/or base-plate-mount 529 may each be substantially rigid. In some embodiments, trigger 121, trigger-holder 523, and/or base-plate-mount 529 may each be substantially constructed from one or more substantially rigid materials of construction. In some embodiments, trigger 121, trigger-holder 523, and/or base-plate-mount 529 may each be substantially constructed from a metal. In some embodiments, trigger 121, trigger-holder 523, and/or base-plate-mount 529 may each be substantially constructed from aluminum, steel, or the like. In some embodiments, trigger 121, trigger-holder 523, and/or base-plate-mount 529 may each be substantially constructed from a rigid thermoplastic; wherein ribbing may be provided to provide increased structural strength; and/or fillers, such as, but not limited to glass fibers, may be used to provide additional structural strength.

Continuing discussing FIG. 5A and FIG. 5B, in some embodiments, clip 141 may comprise a clip-subassembly. In some embodiments, trigger-release-clip 100 may comprise the clip-subassembly. In some embodiments, the clip-subassembly may comprise a torsion-spring 545. In some embodiments, torsion-spring 545 may be a torsion spring. In some embodiments, torsion provided by one or two torsion-springs 545 may be sufficient to hold a weight of lighting module 200 and two trigger-release-clips 100 to planar-member 9001 without lighting module 200 slipping out its receiving hole in planar-member 9001. In some embodiments, torsion-spring 545 may be substantially semi-rigid. In some embodiments, torsion-spring 545 may be substantially constructed from a metal. In some embodiments, torsion-spring 545 may be substantially constructed from steel. In some embodiments, torsion-spring 545 may comprise a pair of opposing spring-coils 547. In some embodiments, clip 141 may be under torsion. In some embodiments, the clip-subassembly may be under torsion. In some embodiments, this torsion may be provided by capture of torsion-spring 545 at torsion-spring-receivers 503 of base-plate 101; i.e., specifically, each spring-coil 547 may be captured at each opposing torsion-spring-receivers 503 of base-plate 101. In some embodiments, torsion-spring 545 may comprise a second terminal end 544 at one end of torsion-spring 545 and a pair of opposing spring-coils 547 at an other end of torsion-spring 545, distal from this second terminal end 544. See e.g., FIG. 5A and FIG. 5B.

In an alternative embodiment, the pair of opposing spring coils 547 of torsion-spring 545 may be replaced with a single spring coil located in between where the pair of opposing spring coils 547 would be located. This embodiment is not shown in the figures.

Continuing discussing FIG. 5A and FIG. 5B, in some embodiments, the clip-subassembly may comprise a bumper 549. In some embodiments, clip 141 may comprise bumper 549. In some embodiments, bumper 549 may cover second terminal end 544 of the clip-subassembly. In some embodiments, bumper 549 may cover terminal end 543 of clip 141. In some embodiments, when trigger-release-clip 100 may be in final configuration 195, a portion of the bumper 549 may be in physical contact with top 9003 of planar-member 9001. (See e.g., FIG. 1C.) In some embodiments, bumper 549 may be substantially constructed from a flexible, soft, and/or elastomeric material of construction. For example, and without limiting the scope of the present invention, in some embodiments, this material of construction may be a rubber, a silicone, or a thermoplastic of appropriate durometer. In some embodiments, a purpose of bumper 549 may be to dampen a blow of clip 141 striking top 9003 of planar-member 9001, which may help to prevent damage to trigger-release-clip 100, lighting module 200, and/or to planar-member 9001.

Continuing discussing FIG. 5A and FIG. 5B, in some embodiments, the clip-subassembly may comprise a bumper-frame 551. In some embodiments, clip 141 may comprise bumper-frame 551. In some embodiments, bumper-frame 551 may attach to second terminal end 544 of torsion-spring 545. In some embodiments, bumper 549 may attach to a portion of bumper-frame 551. In some embodiments, bumper-frame 551 may be disposed between bumper 549 and torsion-spring 545. In some embodiments, bumper-frame 551 may be in physical contact with both bumper 549 and with torsion-spring 545. In some embodiments, bumper-frame 551 may be another and different structural member (different from that of base-plate 101). In some embodiments, bumper-frame 551 may provide some structural rigidity to torsion-spring 545 and/or to bumper 549.

In some embodiments, bumper-frame 551 may be substantially constructed from one or more rigid materials of construction. In some embodiments, bumper-frame 551 may be substantially constructed from one or more semi-rigid materials of construction. In some embodiments, bumper-frame 551 may be constructed from a metal. In some embodiments, bumper-frame 551 may be constructed from a thermoplastic. In some embodiments, a plastic bumper-frame 551 may comprise additional ribbing structures for providing structural strength and/or fillers for strength, such as, but not limited to, glass fibers.

Continuing discussing FIG. 5A and FIG. 5B, in some embodiments, torsion-spring 545 may comprise terminal end 543, which may be located opposing the pair of spring-coils 547. In some embodiments, clip 141 may comprise terminal end 543, which may be located opposing the pair of spring-coils 547. In some embodiments, the clip-subassembly may comprise terminal end 543, which may be located opposing the pair of spring-coils 547. In some embodiments, terminal end 543 may refer to a distal portion of torsion-spring 545, a distal portion of clip 141, a distal portion of bumper 549 and/or a distal portion of the clip-subassembly, with respect to spring-coils 547. In some embodiments, terminal end 543 may be referred to as second terminal 544 when in reference to a terminal end of torsion-spring 545 that may be located opposing the spring-coils 547.

Continuing discussing FIG. 5A and FIG. 5B, in some embodiments, stop 161 may comprise a stop-subassembly. In some embodiments, trigger-release-clip 100 may comprise the stop-subassembly. In some embodiments, the stop-subassembly may comprise a trigger-spring-mount 565, a stop-return-spring 567, and a trigger-spring 569. In some embodiments, the stop-subassembly may comprise stop 161, trigger-spring-mount 565, stop-return-spring 567, and trigger-spring 569. In some embodiments, the stop-subassembly may be housed within cavity 431 of the trigger-subassembly of the trigger 121. In some embodiments, the stop-subassembly may be housed within cavity 431 of the trigger-subassembly of trigger 121. In some embodiments, trigger-spring-mount 565, stop-return-spring 567, and trigger-spring 569 may be housed within cavity 431 of the trigger-subassembly of trigger 121. See e.g., FIG. 4A and FIG. 4B for cavity 431.

Continuing discussing FIG. 5A and FIG. 5B, in some embodiments, trigger-spring-mount 565 may be an elongate structural member. In some embodiments, trigger-spring-mount 565 may be a structural pin (i.e., a rod). In some embodiments, trigger-spring-mount 565 may be in communication with stop-return-spring 567. In some embodiments, trigger-spring-mount 565 may be in communication with trigger-holder 523 of the trigger-subassembly. In some embodiments, a bottom end of trigger-spring-mount 565 may be retained in trigger-spring-mount-receiver 527. In some embodiments, trigger-spring-mount 565 may be located within a hollow cavity of stop-return-spring 567. In some embodiments, trigger-spring-mount 565 may be located substantially concentrically with a center of stop-return-spring 567, as viewed from above or below. In some embodiments, trigger-spring-mount 565 may provide rigid structure to stop-return-spring 567, such that upon compression stop-return-spring 567 does not entirely collapse. In some embodiments, trigger-spring-mount 565 may be substantially rigid. In some embodiments, trigger-spring-mount 565 may be substantially constructed from a rigid material of construction. In some embodiments, trigger-spring-mount 565 may be substantially constructed from a metal. In some embodiments, trigger-spring-mount 565 may be substantially constructed from aluminum, steel, brass, or the like. In some embodiments, trigger-spring-mount 565 may be substantially constructed from a rigid plastic.

Continuing discussing FIG. 5A and FIG. 5B, in some embodiments, stop-return-spring 567 may be an elongate hollow coil spring. In some embodiments, stop-returnspring 567 may be flexible to semi-rigid. In some embodiments, stop-return-spring 567 may be substantially constructed from a metal. In some embodiments, stop-return-spring 567 may be substantially constructed from steel or the like. In some embodiments, stop-return-spring 567 may have an outside diameter that is greater than an outside diameter of trigger-spring-mount 565. In some embodiments, outside diameter of stop-return-spring 567 may be less than outside diameter of trigger-spring 569. In some embodiments, stop-return-spring 567 may be longer than trigger-spring 569.

Continuing discussing FIG. 5A and FIG. 5B, in some embodiments, trigger-spring 569 may be an elongate hollow coil spring (different from that of stop-return-spring 567). In some embodiments, trigger-spring 569 may be flexible to semi-rigid. In some embodiments, trigger-spring 569 may be substantially constructed from a metal. In some embodiments, trigger-spring 569 may be substantially constructed from steel or the like. In some embodiments, trigger-spring 569 may be in communication with stop 161. In some embodiments, trigger-spring 569 may be in communication with trigger 121. In some embodiments, a spring constant of trigger-spring 569 may impact sensitivity of trigger 121. In some embodiments, an elongate portion of stop 161 may reside within the hollow cavity of trigger-spring 569. In some embodiments stop 161, which may be substantially elongate; and may at a distal end comprise a pair of opposing stop-flanges 563. In some embodiments, a distance from one such stop-flange 563 outside edge to another such stop-flange 563 outside edge may be greater than the outside diameter of trigger-spring 569. In some embodiments, these stop-flanges 563 may prevent a bottom end of trigger-spring 569 from translating independently of stop 161. In some embodiments, a top end of trigger-spring 569 may retained within cavity 431, because a top opening to cavity 431 may be smaller than the outside diameter of trigger-spring 569. In some embodiments, portions of trigger 121 may rest upon stop-flanges 563. In some embodiments, depressing trigger 121 may cause retraction of stop 161 by the portions of trigger 121 pressing downwards upon stop-flanges 563 of stop 161. In some embodiments, depressing trigger 121 may cause trigger-spring 569 compression within cavity 431, which in turn may cause stop 161 to retract downwards, resulting in down position 761 (see e.g., FIG. 7A). In some embodiments, depressing trigger 121 may cause trigger-spring 569 to retract stop 161 causing release of clip 141 from pre-loaded configuration 195.

Figure 6A:
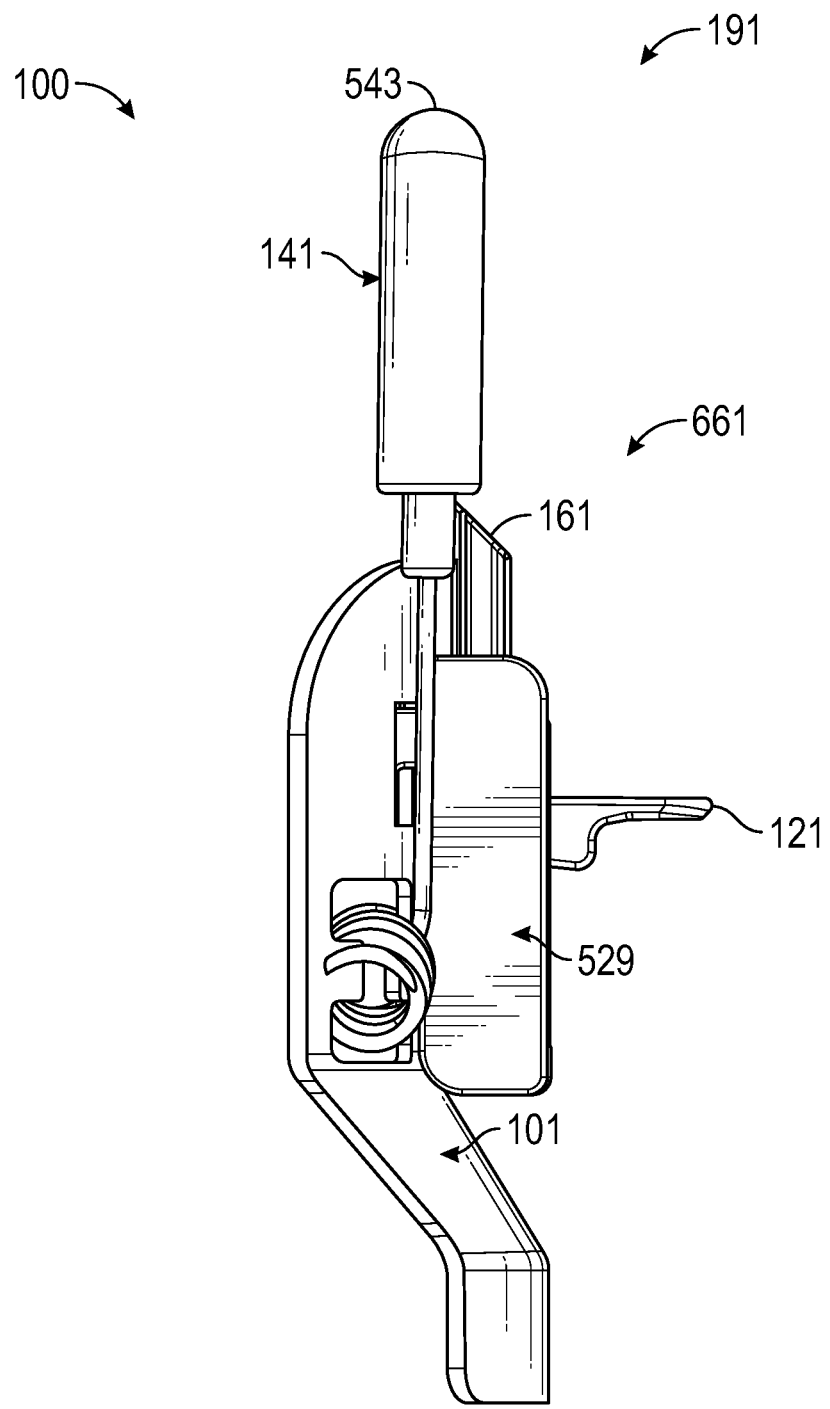
FIG. 6A may depict a single trigger-release-clip, wherein the trigger-release-clip may be in the pre-loaded configuration, shown from a side view (right or left).

Continuing discussing FIG. 5A and FIG. 5B, in some embodiments, when trigger 121 may no longer be depressed, stop-return-spring 567 may press up against a bottom of stop 161, causing return to up position 661 for stop 161 (see e.g., FIG. 6A).

In some embodiments, stop 161 may be substantially constructed from one or more rigid materials of construction. In some embodiments, stop 161 may be constructed from a metal. In some embodiments, stop 161 may be constructed from steel or the like. In some embodiments, stop 161 may be constructed from a thermoplastic; and may include additional ribbing structure for structural strength and/or fillers for strength, such as, but not limited to, glass fibers.

Figure 6B:
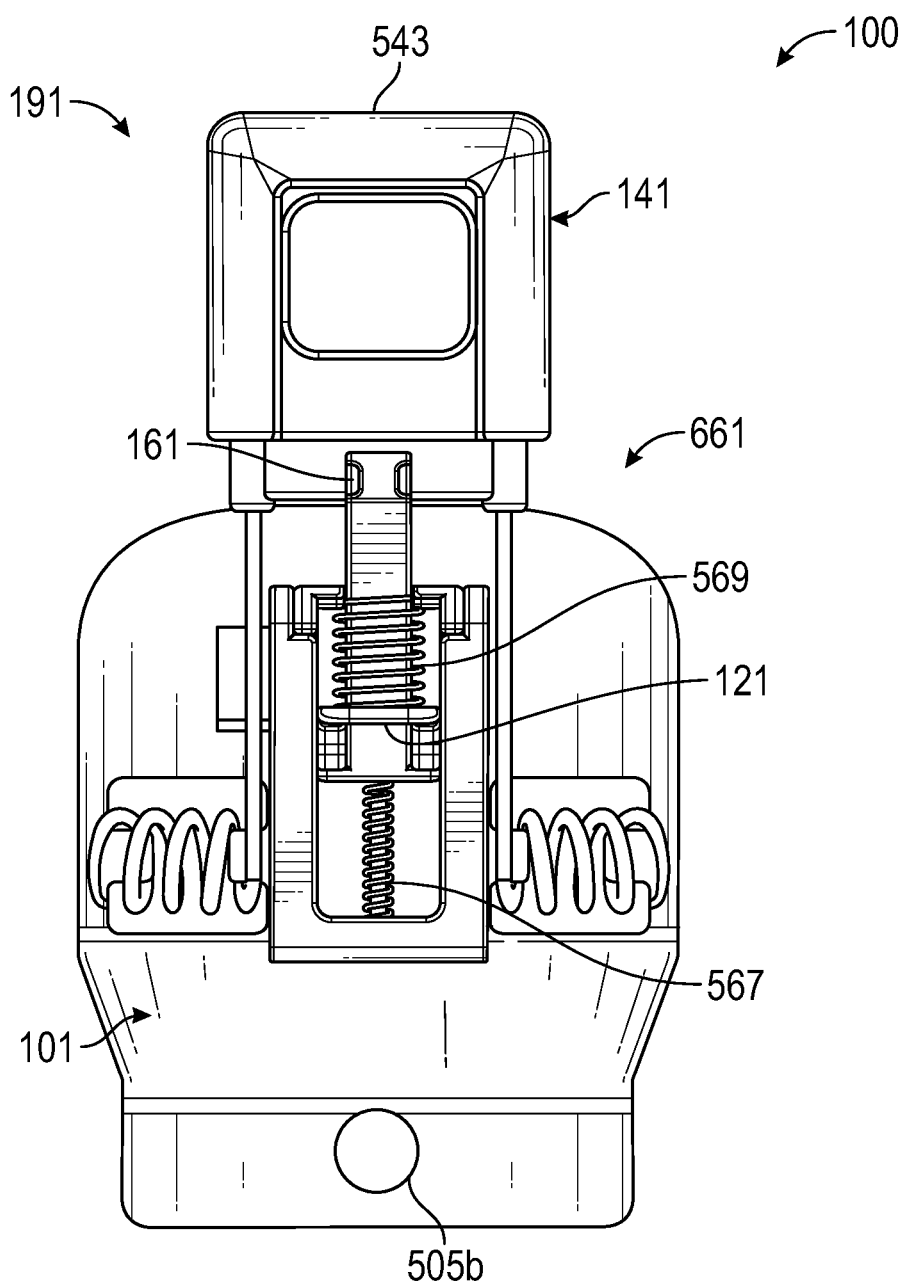
FIG. 6B may depict the trigger-release-clip of FIG. 6A, wherein the trigger-release-clip may be in the pre-loaded configuration, shown from a front view.

FIG. 6A may depict a single trigger-release-clip 100, wherein trigger-release-clip 100 may be in pre-loaded configuration 191, shown from a side view (right or left). FIG. 6B may depict trigger-release-clip 100, wherein trigger-release-clip 100 may be in pre-loaded configuration 191, shown from a front view. FIG. 6A and FIG. 6B may also show stop 161 in up position 661. In some embodiments, when trigger-release-clip 100 may be in up position 661, trigger 121 may not be depressed. In some embodiments, when trigger-release-clip 100 may be in up position 661, stop 161 may be positioned at a maximum height (with respect to spring-coils 547). Note, when stop 161 may be in up position 661, clip 141 may be in pre-loaded configuration 191 or in final configuration 195. In some embodiments, when stop 161 may be in up position 661 and clip 141 may be in pre-loaded configuration 191, then a top distal portion of stop 161 may be blocking some portion of clip 141 from pivoting under the torsion. In some embodiments, when stop 161 may be in up position 661 and clip 141 may be in pre-loaded configuration 191, then a top distal portion of stop 161 may be blocking bumper-frame 551 of clip 141 from pivoting under the torsion.

Figure 7A:
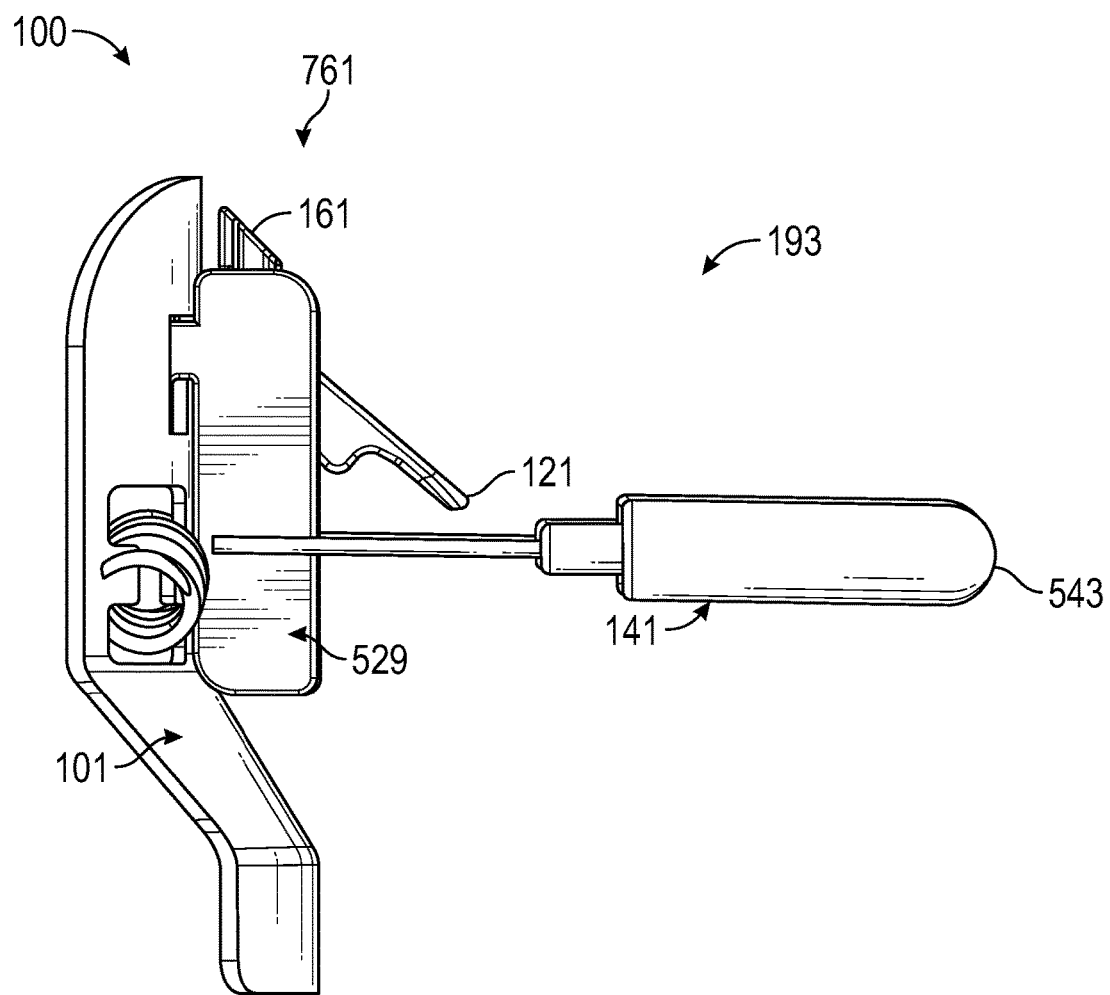
FIG. 7A may depict a single trigger-release-clip, wherein the trigger-release-clip may be in the transitional configuration, shown from a side view (right or left).
Figure 7B:
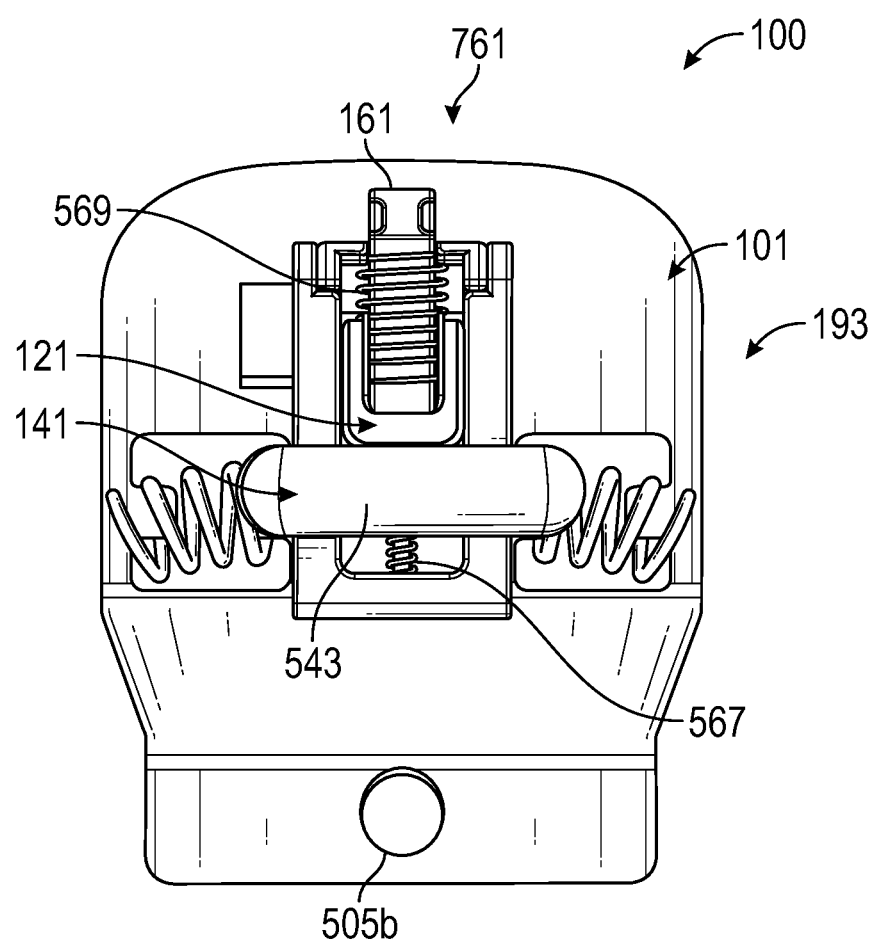
FIG. 7B may depict the trigger-release-clip of FIG. 7A, wherein the trigger-release-clip may be in the transitional configuration, shown from a front view.

FIG. 7A may depict a single trigger-release-clip 100, wherein trigger-release-clip 100 may be in transitional configuration 193, shown from a side view (right or left). FIG. 7B may depict trigger-release-clip 100, wherein trigger-release-clip 100 may be in transitional configuration 193, shown from a front view. FIG. 7A and FIG. 7B may also show stop 161 in down position 761. In some embodiments, when trigger-release-clip 100 may be in down position 761, trigger 121 may be depressed. In some embodiments, when trigger 121 may be depressed, causing retraction of stop 161 into down position 761, now the top distal portion of stop 161 may not be tall enough to block any portion of clip 141 from pivoting downward due to the torsion; and so clip 141 may then pivot downwards due to the torsion as shown in FIG. 7A and in FIG. 7B.

Figure 8A:
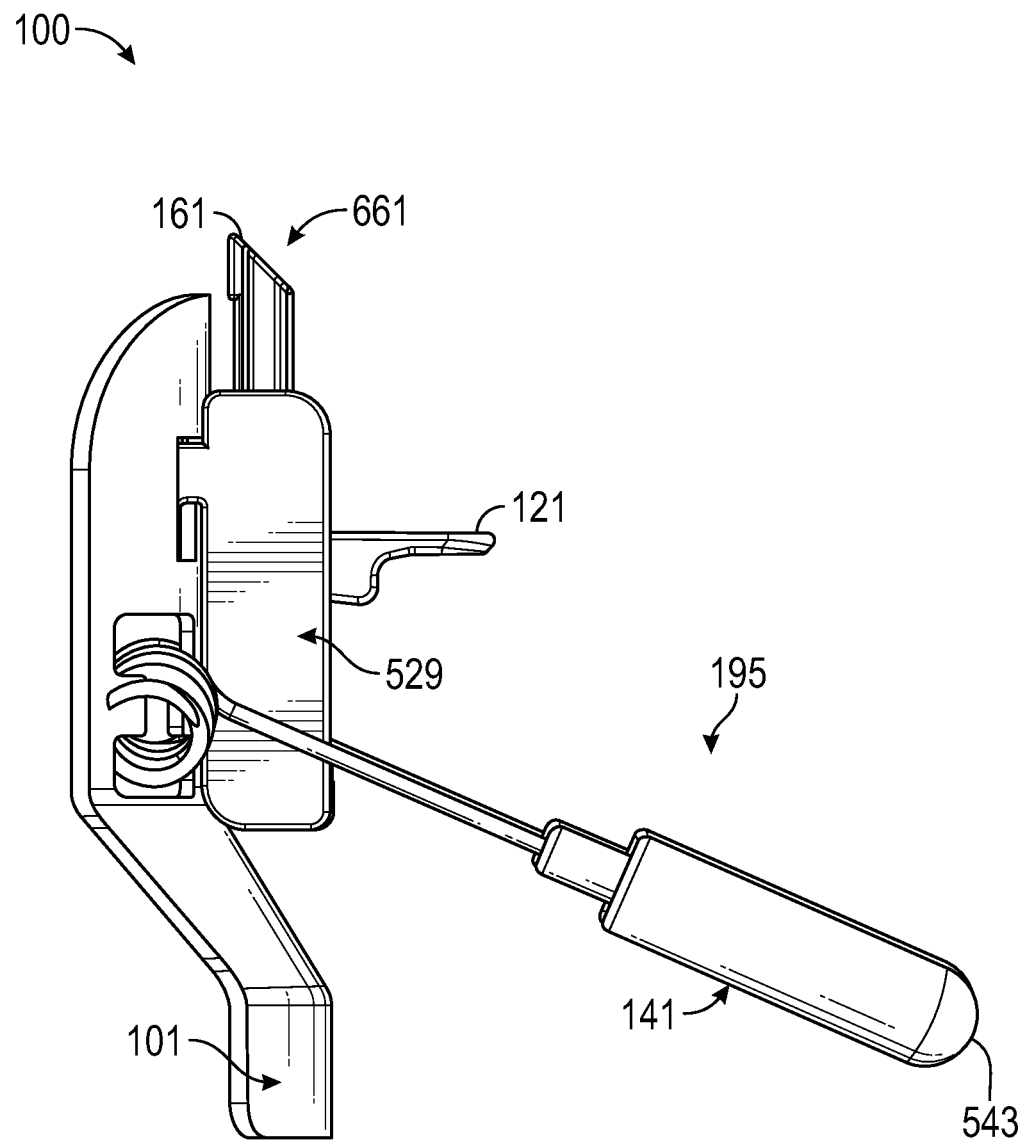
FIG. 8A may depict a single trigger-release-clip, wherein the trigger-release-clip may be in the final configuration, shown from a side view (right or left).
Figure 8B:
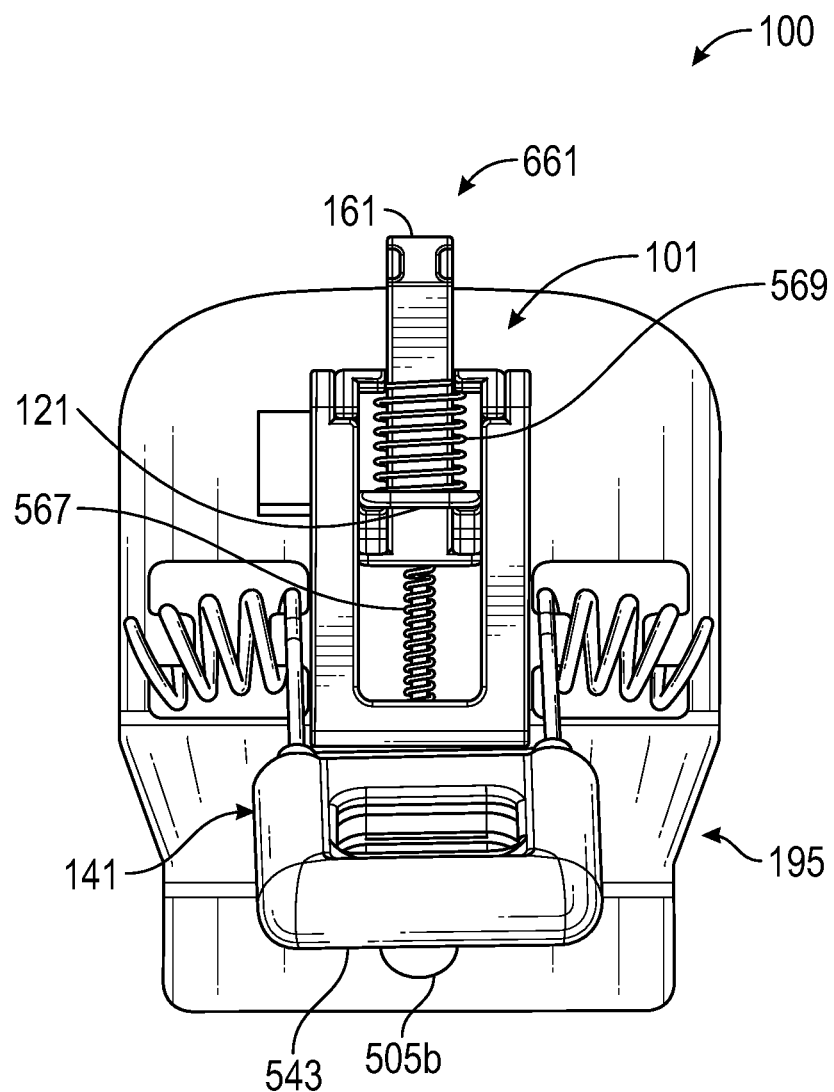
FIG. 8B may depict the trigger-release-clip of FIG. 8A, wherein the trigger-release-clip may be in the final configuration, shown from a front view.

FIG. 8A may depict a single trigger-release-clip 100, wherein trigger-release-clip 100 may be in final configuration 195, shown from a side view (right or left). FIG. 8B may depict trigger-release-clip 100, wherein trigger-release-clip 100 may be in final configuration 195, shown from a front view. Note in FIG. 8A and in FIG. 8B, trigger 121 may no longer be depressed, and so stop-return-spring 567 may have caused stop 161 to return to up position 661, even though terminal end 543 of clip 141 may now disposed in final configuration 195.

Note, in some embodiments, to return clip 141 into pre-loaded configuration 191, trigger 121 may need to be depressed while terminal end 543 is pivoted upwards by a user against the torsion and terminal end 543 brought as close as possible to lighting module 200 (assuming trigger-release-clip 100 is attached to lighting module 200); and still while the user is holding terminal end 543 in that upward pivoted position, then releasing trigger 121, such that stop-return-spring 567 allows stop 161 to transition into up position 661, and for stop 161 to catch (block) clip 141.

Note, in some embodiments, clip 141 may be placed into pre-loaded configuration 191 regardless if trigger-release-clip 100 is attached to lighting module 200. For example, if trigger-release-clip 100 is not attached (or is attached) to lighting module 200, to return clip 141 into pre-loaded configuration 191, trigger 121 may need to be depressed while terminal end 543 is pivoted upwards by a user against the torsion such that a longitude of torsion-spring 545 may be made substantially parallel with a longitude of stop 161; and while the user is still holding clip 141 in that substantial parallel position, then releasing trigger 121, such that stop-return-spring 567 allows stop 161 to transition into up position 661, and for stop 161 to catch (block) clip 141.

In some embodiments, the invention may comprise a system for mounting lighting module 200 to planar-member 9001. In some embodiments, such a system may comprise:

at least one lighting module 200 and at least one trigger-release-clip 100. In some embodiments, such a system may comprise: at least one lighting module 200 and at least two trigger-release-clips 100. In some system embodiments, the at least one trigger-release-clip 100 or the at least two trigger-release-clips 100 may be attached to lighting module 200 as discussed above. For example, and without limiting the scope of the present invention, trigger-release-clip 100 may comprise lighting-module-attachment-means 505; and lighting module 200 may comprise at least one trigger-release-clip-receiver 201 for each trigger-release-clip 100. For example, and without limiting the scope of the present invention, in some system embodiments, for each lighting module 200, there may be two trigger-release-clips 100 opposingly attached to lighting module 200. In some system embodiments, the system may comprise planar-member 9001 or a portion of planar-member 9001.

In some embodiments, the invention may comprise a method for mounting lighting module 200 to planar-member 9001. In some embodiments, this method may be method 900.

Figure 9A:
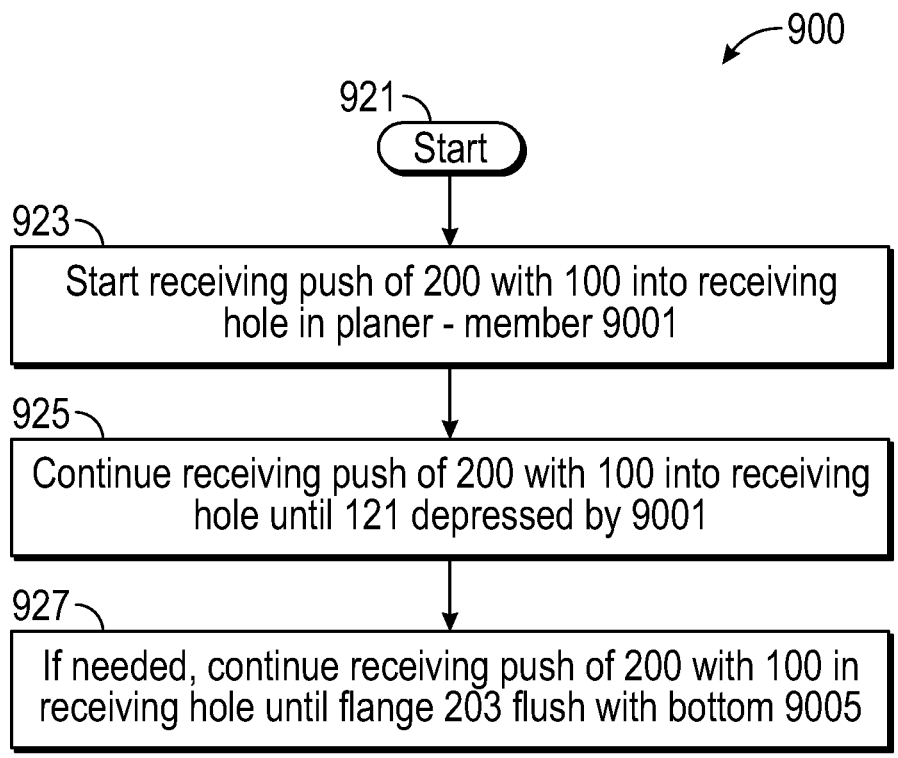
FIG. 9A may depict a flow diagram of steps for a method of mounting a lighting module to a planar-member utilizing at least one trigger-release-clip.
Figure 9B:
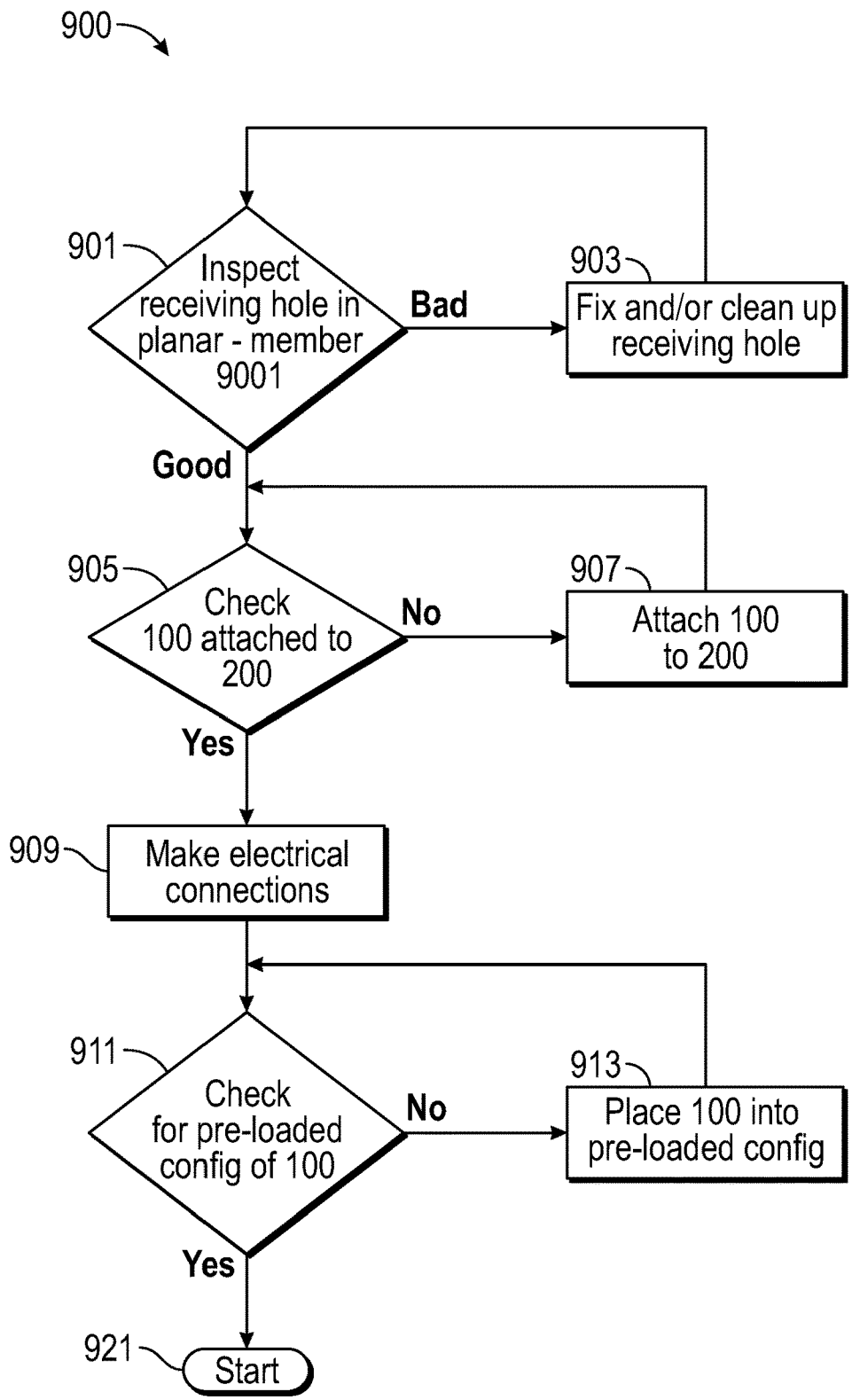
FIG. 9B may depict a flow diagram of additional or preparatory steps for a method of mounting a lighting module to a planar-member utilizing at least one trigger-release-clip.

FIG. 9A may depict a flow diagram of steps for method 900 of mounting lighting module 200 to planar-member 9001 utilizing at least one trigger-release-clip 100. FIG. 9B may depict a flow diagram of additional or preparatory steps for method 900.

Discussing FIG. 9A, in some embodiments, method 900 may comprise steps: start 921, step 923, and step 925. In some embodiments, step 923 may be a step of starting to receive pushing of lighting module 200 with at least one attached trigger-release-clip 100, in pre-loaded configuration 191, into a receiving hole in planar-member 9001. In some embodiments, step 925 may be a step of continuing to receive pushing of lighting module 200 with at least one attached trigger-release-clip 100, into the receiving hole in planar-member 9001; until trigger(s) 121 may be depressed by butting against bottom 9005 of planar-member 9001; which may release clip 141 that is under torsion. In some embodiments, depending upon a strength of torsion in torsion-spring 545 and frictional forces, torsion-spring 545 may cause transition into final configuration 195, with terminal end(s) 543 of clip(s) 141 against top 9003 of planar-member 9001. (See e.g., FIG. 1C.) In some embodiments, depending upon the strength of torsion in torsion-spring 545 and the frictional forces, torsion-spring 545 may cause flange 203 of lighting module 200 to butt against bottom 9005 of planar-member 9001.

Continuing discussing FIG. 9A, in some embodiments, method 900 may further comprise step 927. In some embodiments, step 927 may be a step of continuing to receive pushing of lighting module 200 with at least one attached trigger-release-clip 100, into the receiving hole in planar-member 9001, until flange 203 of lighting module 200 may be flush against bottom 9005 of planar-member 9001. In some embodiments, step 927 may be optional. In method 900 a pusher, i.e., one who may be pushing lighting module 200 with at least one attached trigger-release-clip 100, into the receiving hole, may be an installer or a user.

Discussing FIG. 9B, in some embodiments, method 900 may further comprise steps: step 901, step 905, step 909, and/or step 911; wherein these steps may precede start step 921. In some embodiments, step 901 may be step of inspecting the receiving hole in planar-member 9001. Such an inspection may check for a properly sized receiving hole. Such a receiving hole should be larger than both the outside diameter of lighting module 200 (not including the outside diameter of flange 203), and large enough to accommodate passage of triggers 121 into the receiving hole. Additionally, a cavity of the receiving hole should be free from obstruction that might interfere with pivoting movement of clip(s) 141. If inspection of the receiving hole in planar-member 9001 is bad, then method 900 may progress to step 903, wherein problems with the receiving hole and/or its cavity are fixed and/or cleaned up. Step 903 may then progress back to step 901. In some embodiments, if step 901 inspection may be good, then method 900 may progress to step 905, to step 909, to step 911, or to start step 921.

Continuing discussing FIG. 9B, in some embodiments, step 905 may be step of checking if at least one trigger-release-clip 100 may be attached to lighting module 200. In some embodiments, step 905 may be step of checking if at least two trigger-release-clips 100 may be attached to lighting module 200. If not attached, then step 905 may progress into step 907 of attaching at least one trigger-release-clip 100 to lighting module 200. Step 907 may then progress back into checking step 905. In some embodiments, if checking step 905 inspection may be yes attached, then method 900 may progress to step 909, to step 901, to step 911, or to start step 921.

Continuing discussing FIG. 9B, in some embodiments, step 909 may be step of making proper electrical connections to lighting module 200. In some embodiments, after electrical connections are made in step 909, method 900 may progress into step 911, step 905, and/or to start step 921.

Continuing discussing FIG. 9B, in some embodiments, step 911 may be step of checking if all trigger-release-clip(s) 100 may be in pre-loaded configuration 191. If any trigger-release-clip 100 may not be in pre-loaded configuration 191, then step 911 may progress to step 913. Step 913 may comprise placing any trigger-release-clip 100 not in pre-loaded configuration 191 into pre-loaded configuration 191 as described earlier. Step 913 may then progress back into checking step 911. If checking step 911 determines all trigger-release-clip(s) 100 may be in pre-loaded configuration 191, then method 900 may progress into start step 921.

In some embodiments, step 901, step 905, step 909, and step 911 may be performed out of numerical order indicated by each respective reference numeral.

A trigger-release-clip, systems of using trigger-release-clips with lighting modules, and methods of use, have been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A trigger-release-clip for mounting a lighting module to a planar-member; wherein the trigger-release-clip comprises:
   a base-plate that is a structural member that attaches to the lighting module;
   a trigger that is in communication with the base-plate;
   a clip that is in communication with the base-plate; wherein the clip comprises a terminal end;
   a stop that is in communication with the trigger;

wherein the trigger-release-clip exists in at least two configurations, a pre-loaded configuration and a final configuration; wherein in the pre-loaded configuration the trigger is positioned to keep the stop in an up position that prevents the clip from actuating and keeps the terminal end of the clip proximate to a portion of the lighting module;

wherein in the final configuration, the trigger has been depressed pivoting downwards causing the stop to transition into a down position that allows the clip to actuate and allows the terminal end of the clip to pivot away from the portion of the lighting module.

2. The trigger-release-clip according to claim 1, wherein the base-plate is substantially constructed from one or more rigid materials of construction.

3. The trigger-release-clip according to claim 1, wherein the base-plate comprises opposing pairs of torsion-spring-receivers for receiving a torsion-spring of the clip.

4. The trigger-release-clip according to claim 1, wherein the base-plate comprises a lighting-module-attachment-means, wherein the lighting-module-attachment-means provides structure for attaching the base-plate to the lighting module.

5. The trigger-release-clip according to claim 1, wherein the base-plate comprises trigger-subassembly-receivers for receiving a trigger-subassembly of the trigger.

6. The trigger-release-clip according to claim 1, wherein the trigger comprises a trigger-subassembly; wherein the trigger subassembly comprises a trigger-holder and a base-plate-mount; wherein the trigger is pivotally attached to the trigger-holder; and the trigger-holder is attached to base-plate-mount; and the base-plate-mount is attached to the base-plate at trigger-subassembly-receivers of the base-plate.

7. The trigger-release-clip according to claim 6, wherein the trigger and the trigger-subassembly are substantially constructed from one or more substantially rigid materials of construction.

8. The trigger-release-clip according to claim 1, wherein the clip comprises a clip-subassembly; wherein the clip-subassembly comprises a torsion-spring; wherein the clip is under torsion.

9. The trigger-release-clip according to claim 8, wherein the terminal end of the clip is a first terminal end, wherein the torsion-spring comprises a second terminal end at one end of the torsion-spring and a pair of opposing spring-coils at an other end of the torsion-spring.

10. The trigger-release-clip according to claim 8, wherein the clip-subassembly further comprises a bumper to cover the second terminal end of the torsion-spring.

11. The trigger-release-clip according to claim 10, wherein the clip-subassembly further comprises a bumper-frame that attaches to the second terminal end of the torsion-spring; and wherein the bumper attaches to a portion of the bumper-frame; wherein the bumper-frame is a different structural member from the structural member of the base-plate.

12. The trigger-release-clip according to claim 1, wherein the stop comprises a stop-subassembly; wherein the stop-subassembly comprises a trigger-spring-mount, a stop-return-spring, and a trigger-spring; wherein the stop-subassembly are housed within a cavity of a trigger-subassembly of the trigger; wherein the trigger-spring-mount is a structural pin that is in communication with the stop-return-spring and in communication with a trigger-holder of the trigger-subassembly; wherein the trigger-spring is in communication with the stop and in communication with the trigger; wherein depressing the trigger causes the trigger-spring to retract the stop causing release of the clip from the pre-loaded configuration.

13. A system for mounting a lighting module to a planar-member;
wherein the system comprises:
a lighting module with opposing trigger-release-clip-receivers;
two trigger-release-clips for attachment at each of the opposing trigger-release-clip-receivers; wherein each trigger-release-clip comprises:
a base-plate that is a structural member that attaches to the lighting module at one of the trigger-release-clip-receivers;
a trigger that is in communication with the base-plate;
a clip that is in communication with the base-plate; wherein the clip comprises a terminal end;
a stop that is in communication with the trigger;
wherein the trigger-release-clip exists in at least two configurations, a pre-loaded configuration and a final configuration; wherein in the pre-loaded configuration the trigger is positioned to keep the stop in an up position that prevents the clip from actuating and keeps the terminal end of the clip proximate to a portion of the lighting module;
wherein in the final configuration, the trigger has been depressed pivoting downwards causing the stop to transition into a down position that allows the clip to actuate and allows the terminal end of the clip to pivot away from the portion of the lighting module.

14. A trigger-release-clip for mounting a lighting module to a planar-member; wherein the trigger-release-clip comprises:
a base-plate that is a structural member that attaches to the lighting module;
a trigger that is in communication with the base-plate;
a clip that is in communication with the base-plate; wherein the clip comprises a terminal end;
a stop that is in communication with the trigger, wherein the stop comprises a stop-subassembly; wherein the stop-subassembly comprises a trigger-spring-mount, a stop-return-spring, and a trigger-spring; wherein the stop-subassembly are housed within a cavity of a trigger-subassembly of the trigger; wherein the trigger-spring-mount is a structural pin that is in communication with the stop-return-spring and in communication with a trigger-holder of the trigger-subassembly; wherein the trigger-spring is in communication with the stop and in communication with the trigger;
wherein the trigger-release-clip exists in at least two configurations, a pre-loaded configuration and a final configuration; wherein in the pre-loaded configuration the trigger is positioned to keep the stop in an up position that prevents the clip from actuating and keeps the terminal end of the clip proximate to a portion of the lighting module;
wherein in the final configuration, the trigger has been depressed causing the trigger-spring to retract the stop into a down position that releases the clip and allows the clip to actuate such that the terminal end of the clip pivots away from the portion of the lighting module.

15. The trigger-release-clip according to claim 14, wherein the base-plate is substantially constructed from one or more rigid materials of construction.

16. The trigger-release-clip according to claim 14, wherein the base-plate comprises a lighting-module-attachment-means, wherein the lighting-module-attachment-means provides structure for attaching the base-plate to the lighting module.

17. The trigger-release-clip according to claim 14, wherein the base-plate comprises trigger-subassembly-receivers for receiving the trigger-subassembly of the trigger.

18. The trigger-release-clip according to claim 14, wherein the trigger comprises the trigger-subassembly; wherein the trigger subassembly comprises the trigger-holder and a base-plate-mount; wherein the trigger is pivotally attached to the trigger-holder; and the trigger-holder is attached to base-plate-mount; and the base-plate-mount is attached to the base-plate at trigger-subassembly-receivers of the base-plate.

19. The trigger-release-clip according to claim 14, wherein the trigger is substantially constructed from one or more substantially rigid materials of construction.

20. The trigger-release-clip according to claim 14, wherein the clip comprises a clip-subassembly; wherein the clip-subassembly comprises a torsion-spring; wherein the clip is under torsion.

\* \* \* \* \*